US012265920B2

(12) United States Patent
Mueller et al.

(10) Patent No.: US 12,265,920 B2
(45) Date of Patent: Apr. 1, 2025

(54) CODE-FREE AUTOMATED MACHINE LEARNING

(71) Applicant: Amazon Technologies, Inc., Seattle, WA (US)

(72) Inventors: Jonas Mueller, San Francisco, CA (US); Tatsuya Arai, Los Altos Hills, CA (US); Abhi Vinayaka Sharma, Mountain View, CA (US); Ryan Matthew Brand, New York, NY (US); Yohei Nakayama, San Francisco, CA (US); Nick Dean Erickson, Seattle, WA (US); Hang Zhang, San Carlos, CA (US); Mu Li, Union City, CA (US); Alexander Johannes Smola, Sunnyvale, CA (US)

(73) Assignee: Amazon Technologies, Inc., Seattle, WA (US)

(*) Notice: Subject to any disclaimer, the term of this patent is extended or adjusted under 35 U.S.C. 154(b) by 290 days.

(21) Appl. No.: 16/849,537

(22) Filed: Apr. 15, 2020

(65) Prior Publication Data

US 2021/0326717 A1 Oct. 21, 2021

(51) Int. Cl.
*H04L 29/06* (2006.01)
*G06N 5/04* (2023.01)
*G06N 20/00* (2019.01)

(52) U.S. Cl.
CPC ............... *G06N 5/04* (2013.01); *G06N 20/00* (2019.01)

(58) Field of Classification Search
CPC .......... G06N 5/04; G06N 20/00; G06N 3/08; G06N 5/003; G06N 20/20; G06N 5/01;
(Continued)

(56) References Cited

U.S. PATENT DOCUMENTS

| 2014/0188928 A1* | 7/2014 | Singh | G06F 16/9024 |
| | | | 707/769 |
| 2015/0073929 A1* | 3/2015 | Psota | G06Q 30/0605 |
| | | | 705/26.2 |

(Continued)

OTHER PUBLICATIONS

International Preliminary Report on Patentability, PCT App. No. PCT/US2021/027060, Oct. 27, 2022, 11 pages.
(Continued)

*Primary Examiner* — Joseph P Hirl
*Assistant Examiner* — Leynna Truvan
(74) *Attorney, Agent, or Firm* — Nicholson De Vos Webster & Elliott LLP

(57) ABSTRACT

Techniques for code-free automated machine learning (ML) are described. Users can train high-quality ML models and pipelines without necessarily needing to write code by providing a training dataset to a code-free machine learning service. The service may deploy an ML orchestration function and a storage location on behalf of a user. When a modification is made to the storage bucket, such as by the user providing a training dataset, the orchestration function is invoked and can automatically initiate an AutoML process using at least the training data to train multiple ML model variants. The resultant ML model(s) and associated metrics can be provided to the user, deployed behind an endpoint, and/or used to generate inferences.

20 Claims, 13 Drawing Sheets

(58) Field of Classification Search
CPC ........ G06Q 50/10; G06Q 10/06; G06F 9/465; G06F 30/27; G06F 16/221; G03F 7/706841; G05D 2101/15; G06T 5/60; G06T 2207/20081; G06V 10/70; G16B 40/00; G16C 20/70; H04L 41/16; H04L 45/08; G05B 2219/33038

See application file for complete search history.

(56) References Cited

U.S. PATENT DOCUMENTS

| | | | | |
|---|---|---|---|---|
| 2017/0185922 | A1* | 6/2017 | Lange | G06N 5/003 |
| 2018/0336484 | A1* | 11/2018 | Hunt | G06N 7/01 |
| 2019/0095515 | A1* | 3/2019 | Buesser | G06N 5/022 |
| 2019/0095817 | A1* | 3/2019 | Ma | H04L 67/10 |
| 2019/0236487 | A1* | 8/2019 | Huang | G06N 20/00 |
| 2021/0065048 | A1* | 3/2021 | Salonidis | G06F 9/542 |

OTHER PUBLICATIONS

Anonymous, "Automated Machine Learning", Wikipedia, Retrieved from <https://en.wikipedia.org/w/index.php?title=Automated_machine_learning&oldid=941347179>, Feb. 18, 2020, 4 pages.

Dotnet Bot, et al., "FileSystemWatcher Class (System. IO)", Microsoft Docs, Retrieved from <https://docs.microsoft.com/en-us/dotnet/api/system.io.filesystemwatcher?redirectedfrom=MSDN&view=net-5.0>, Apr. 3, 2003, pp. 1-10.

International Search Report and Written Opinion, PCT App. No. PCT/US2021/027060, Jul. 14, 2021, 14 pages.

Liu, Bin, "A Very Brief and Critical Discussion on AutoML", School of Computer Science, Nanjing University of Posts and Telecommunications, Cornell University Library, Nov. 9, 2018, pp. 1-6.

Myassays Ltd., "Folder Poll General User's Guide Contents", Document Version 11, Product Release Version 3.0, Jan. 2016, pp. 1-37.

Myassays, "Folder Poll with MyAssays Desktop", Retrieved from <https://www.myassays.com/folder-poll-wth-myassays-desktop.video>, Apr. 20, 2016, 1 page.

Simon, Julien, "Amazon SageMaker Autopilot—Automatically Create High-Quality Machine Learning Models With Full Control And Visibility", AWS News Blog, Dec. 3, 2019, pp. 1-6.

Office Action, EP App. No. 21724078.7, Mar. 24, 2023, 7 pages.

Intention to Grant, EP App. No. 21724078.7, Oct. 12, 2023, 9 pages.

* cited by examiner

FIG. 4

CONFIG. INFO 109

```
// RESOURCE LIMITS
MAX_TRAINING_JOBS = 500
MAX_RUNTIME_PER_TRAINING=240
MAX_COST_PER_EXPLORATION=25

// RESOURCE RESERVATION
INSTANCE_TYPE=AUTO
INSTANCE_NUM=AUTO

// TRAINING DATA CONFIG
TRAINING_IDENTIFIER=SUFFIX
SUFFIX_IDENTIFIER=TRAIN
TRAINING_DATATYPE=CSV
TARGET_COLUMN_NAME=TARGET

// MACHINE LEARNING PROBLEM TYPE
PROBLEM_TYPE=AUTO
OBJECTIVE_METRIC=AUTO
AVAILABLE_ALGORITHMS= {ALGO_1; ALGO_3}
CREATE_ENSEMBLE=AUTO
```

CONFIG. ATTRIBUTE 430    CONFIG. VALUE 435

TRAINING DATASET 202 (OR TESTING DATASET 204)

SAMPLES 410

TARGET VARIABLE 402

| AGE | COLOR | ZIP | EDUCATION | HAIR | TARGET |
|---|---|---|---|---|---|
| 25 | PURPLE | 54214 | BACHELORS | BLONDE | CHEESE |
| 23 | RED | 79114 | MIDDLE | BROWN | PEPPERONI |
| 46 | BLUE | 94117 | HIGHSCHOOL | BROWN | DELUXE |
| 55 | BLACK | 93148 | HIGHSCHOOL | BLACK | PEPPERONI |
| 36 | PURPLE | 55744 | MIDDLE | BLONDE | CHEESE |

HEADINGS 404

VALUES 406

INFERENCE DATASET 206

SAMPLES 412

| AGE | COLOR | ZIP | EDUCATION | HAIR | TARGET |
|---|---|---|---|---|---|
| 14 | GREEN | 56471 | BACHELORS | BROWN | |
| 34 | ? | 37214 | PROFESSIONAL | BROWN | |
| 44 | BLACK | 14822 | HIGHSCHOOL | BLONDE | |

ML PIPELINE EXPLORATION
*INTERACTIVE CODE EXPLORATION NOTEBOOK*

PREPARE DATASET:

```
BASE_JOB_NAME = 'MY-PREDICTION-11FEB'
DATASET_URL = 'STORAGE://DATAALL-LOC1-OOM/FILTERED/'
STORAGE_LOC= 'STORAGE://WESTREGION-LOC1-OOM/INTERMEDIATE/'
IMPORT MLSERVICE
IMPORT MLSERVICE.AUTOML AS AUTOML
FROM MLSERVICE.AUTOML IMPORT UNIQIFY
...
```
— 805

DEFINE FEATURE PROCESSING PIPELINES:

```
%%MLSERVICE_PIPELINE --STEP FP_BASELINE
FP0 = SCIKITLEARN(
        SOURCE_DIR='FEATURE_PROCESSORS'
        TRAIN_INSTANCE_TYPE='X1.Y2.2XL'
        TRAIN_INSTANCE_COUNT=1
        ...
)
FP0.FIT(DATASET_URL, JOB_NAME=BASE_JOB_NAME+'-FP0-BASELINE'+UNIQIFY(), WAIT=TRUE)
%%MLSERVICE_PIPELINE --STEP FP_BASELINE
BT0 = FP0.TRANSFORMER(
        INSTANCE_TYPE='ML.M5.XLARGE',
        ...
)
BT0.TRANSFORM(DATASET_URL, JOB_NAME=BASE_JOB_NAME+'-BT0-BASELINE'+UNIQIFY(), WAIT=TRUE)
...
```
— 810

RUN PIPELINES IN PARALLEL:

RUNNING PIPELINE FP_BASELINE
RUNNING PIPELINE FP_QUADRATIC
RUNNING PIPELINE FP_BUCKETIZE
RUNNING PIPELINE FP_LOGBUCKETIZE

— 815

MODEL TRAINING AND TUNING:

```
ALGO_LIST = [
    {
        'NAME'='LINEAR1',
        'ALGORITHM'='LINEARLEARNER',
        'HYPERPARAMETER_RANGES': [],
        'INPUT_URL': STORAGE_LOC + '/FP0-BASELINE/',
    }, {
        'NAME'='LINEAR2',
        'ALGORITHM'='LINEARLEARNER',
        'HYPERPARAMETER_RANGES': [],
        'INPUT_URL': STORAGE_LOC + '/FP0-QUADRATIC/',
    }, {
        'NAME'='XG_BOOST_1',
        'ALGORITHM'='XGBOOST',
        'HYPERPARAMETER_RANGES': [],
        'INPUT_URL': STORAGE_LOC + '/FP0-BASELINE/',
```
— 820

*FIG. 8*

CODE-FREE AUTOMATED MACHINE LEARNING

BACKGROUND

The field of machine learning has become widely accepted as a significant driver of the future of technology. Organizations everywhere now seek to use machine learning techniques to address a wide variety of problems, such as optimizing aspects of their products, internal processes, customer experience, etc. While the high-level view of machine learning sounds simple—e.g., provide training data to a computer, to allow the computer to automatically learn from the training data to generate a model that can make predictions for other data—implementing machine learning in practice can be tremendously difficult.

For example, many organizations are racing to implement ML solutions for their business problems, such as classification models for fraud detection and churn prediction, or regression models for risk assessment. However, building these solutions generally requires hiring experts in machine learning, who are in short supply and hard to retain. Due to a lack of deep training in math and statistics, most software engineers have a hard time developing good judgement on why one ML algorithm will work better than another, not to mention finding appropriate algorithm parameters. Beyond that, often times users need to clean up the data or preprocess it in order to build good models, and most users don't have the knowledge or ability to do that. Instead, typically users will use a dataset as it is, try one or two algorithms that are easy to use, and settle for whatever quality level they achieve—or give up entirely. As a result, organizations struggle with getting the desired model quality. Additionally, even for data scientists who have comprehensive ML knowledge, these scientists may need to spend huge amounts of their time experimenting with different ML solutions in order to find a best one for a particular problem.

These and other difficulties are partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which:

FIG. 4 is a diagram illustrating exemplary user-provided training data, testing data, and configuration information for code-free automated machine learning according to some embodiments.

FIG. 8 is a diagram illustrating one exemplary interactive code exploration user interface for viewing and/or modifying an automated machine learning pipeline exploration according to some embodiments.

DETAILED DESCRIPTION

Figure 1:
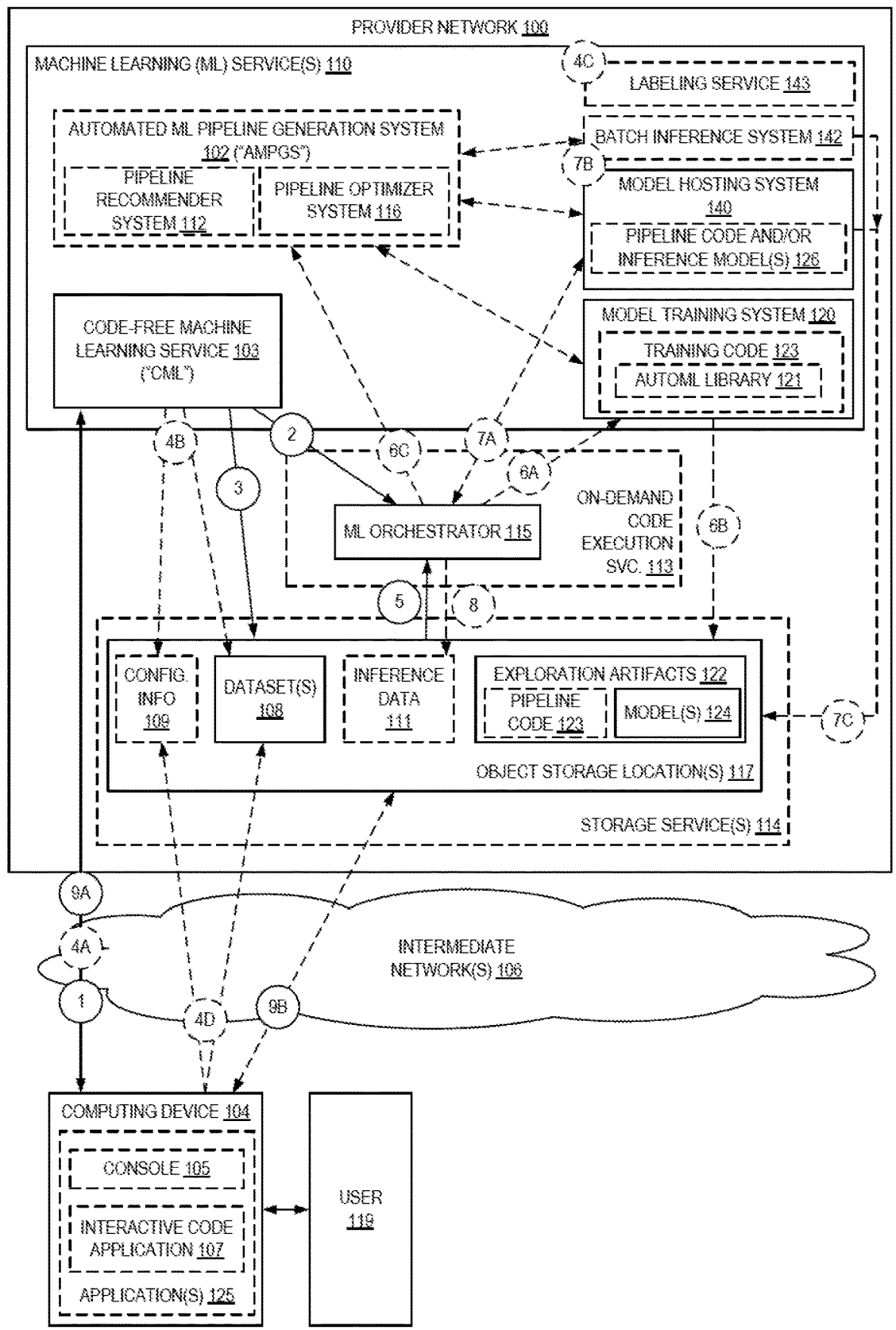
FIG. 1 is a diagram illustrating an environment for code-free automated machine learning according to some embodiments.

The present disclosure relates to methods, apparatus, systems, and non-transitory computer-readable storage media for code-free automated machine learning. According to some embodiments, a code-free machine learning ("CIVIL") service of a service provider network enables users to easily train high-quality custom machine learning (ML) models and/or pipelines for without necessarily needing to write code or have significant knowledge of ML concepts or techniques.

In some embodiments, the CML service allows users to easily construct optimized ML pipelines by simply providing a training dataset—and possibly, nothing more. In some embodiments, upon a user wishing to make use of the CML service, the CIVIL service—which may operate in a multi-tenant service provider network—may deploy a storage location for the user (such as an object storage "bucket" or "folder" provided by a storage service, possibly of the same service provider network) as well as a ML orchestrator (e.g., as a function executed by an on-demand code execution service, possibly of the same service provider network) for the user. The CIVIL service may configure the storage location to directly or indirectly provide an event notification to the ML orchestrator upon a dataset (and/or other data, such as optional configuration data) being stored at the storage location. The ML orchestrator may then make use of the dataset (and optionally other data) by utilizing an Automated Machine Learning system (or "AutoML" system), to train multiple ML models, e.g., via an exploratory process involving automated data preparation and ingestion, feature engineering, algorithm selection, hyperparameter optimization, pipeline selection, etc. Thus, in some embodiments a user may utilize a simple user interface (UI) such as a graphical user interface (GUI) provided by the CIVIL service to simply upload (e.g., via a drag-and-drop) a dataset to the storage location, which automatically triggers the ML orchestrator to make use of an AutoML system to obtain a "best" ML pipeline (which may optionally be just a single ML model) based on the AutoML system exploring multiple pipeline variants and selecting a best resultant pipeline. The user may also provide, via a same or adjacent interface, data to be labeled/inferred and the ML orchestrator may be notified via an event message, enabling it to similarly detect this data and utilize the trained ML pipeline(s) to generate inferences for the user, which can be written back to the storage location, sent back the user's device, etc. Accordingly, the user may utilize a simple UI to provide a training dataset of interest and the CML service may thus abstract away all of the complexity required to train (and optionally use) a ML model that was specifically-selected and trained for that user's use-case.

Generally, as used herein, a ML pipeline is a series of processing steps that collectively operate on input data to generate an ML inference result, which may include feature and target preprocessing operations (or, a "feature preprocessing pipeline" of the overall ML pipeline, which may include use of one or more ML models) followed by an inference ML model, for example. The CIVIL service, via use of the ML orchestrator, can generate a single trained ML pipeline that can be deployed to execute real time or batch inference. In some embodiments, the CML service may also allow more advanced or curious users to have visibility into the details of the resulting ML model, the details of the training job(s) leading to the ML model, the parameters and operations of the ML pipeline, and/or some or all of these details of other ML pipelines that were explored yet ultimately determined to be less-performant than the best one. In some embodiments the CIVIL service can also produce feature processing code and interactive code exploration "notebooks" that educate users regarding the components of the ML pipeline(s), providing explanation of the steps taken by the system. In some embodiments, the CML service thus provides a "white box" approach by showing users the incremental steps or jobs that were executed to arrive at an ultimate ML model produced for inference purposes, which may also enable users to further fine-tune ML pipelines to their specific needs.

In some embodiments, users are thus enabled to quickly build ML models—e.g., classification and regression models—without any substantial ML knowledge. For example, users in some embodiments may provide a dataset in a specific (or flexibly, in any of multiple different) formats), and the CIVIL service then automatically explores ML pipeline solutions with different combinations of data preprocessors, algorithms, and/or algorithm parameter settings to find a "best" model. In some embodiments, users may even directly deploy this best model (in terms of a ML pipeline) to a production environment (e.g., with just one click), download the model or pipeline code, view advanced training details, etc.

Generally, automated machine learning (AutoML) is the process of automating the complex procedures for applying machine learning to real-world problems. AutoML may cover the complete training pipeline, from beginning with the raw dataset to ending with a deployable ML model. As described herein, automating the process of applying machine learning in an end-to-end manner beneficially offers the advantages of producing simpler solutions, faster creation of those solutions, and models that often outperform hand-designed models.

FIG. 1 is a diagram illustrating an environment for code-free automated machine learning according to some embodiments. In FIG. 1, the CIVIL service 103 is implemented as part of a machine learning service 110 develops, evaluates, and/or deploys ML pipelines on behalf of users 119. The CML service 103 (and ML service 110) may be implemented as software, hardware, or a combination of both using one or more computing devices in one or multiple networks and/or geographic locations. In some embodiments, the CIVIL service 103 is implemented within a multi-tenant provider network 100 and operates as part of a ML service 110 to offer ML-related operations described herein as a web-service to users 119.

A service provider network 100 (or, "cloud" provider network) provides users 119 with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service 114 that can store data objects, etc. The users 119 (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) using computing device(s) 104 via one or more interface(s), such as through use of application programming interface (API) calls, via a console implemented as a website or application, etc. The interface(s) may be part of, or serve as a frontend to, a control plane of the provider network 100 that includes "backend" services supporting and enabling the services that may be more directly offered to customers.

For example, a cloud provider network (or just "cloud") may refer to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network 106 (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network 100 itself—that can be executed in an on-demand manner. Serverless functions may be maintained within provider network 100 by an on-demand code execution service 113 and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function itself may be executed by a compute instance, such as a virtual machine, container, etc., when triggered or invoked. In some embodiments, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function—thus, from the perspective of users, these functions are executed without the user needing to deploy or manage servers and other infrastructure, making it "serverless." Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

As described herein, in some embodiments the CML service 103 makes the ML model building process easier and faster—and in some cases, "code free" in that the user 119 does not need to write any commands, function calls, etc., and may potentially only interact with the CML service 103 via simple GUIs.

To start the process, in some embodiments a user 119 may utilize an application 125 (e.g., a web-application implementing a console 105 for the provider network 100, a standalone application, a plugin to another application (e.g., a spreadsheet plug, a file explorer type plug), another web-application of another entity that utilizes the CML service 103 as a part of its backend, a database or mixed-SQL environment interface, etc.) executed by a computing device 104 to interact with the CML service 103 as shown by circle (1). In some embodiments, the user 119 may interact with a general console of the provider network 100 and utilize a user interface element (e.g., a button, link, text box, radio button, etc.) to navigate to a UI associated with the CML service 103. In some embodiments, at this point the CIVIL service 103 deploys architectural resources for the user 119, though in other embodiments the CIVIL service 103 waits until the user 119 has made a different selection, e.g., by selecting a "deploy resources" type UI element, etc.

In some embodiments, the CIVIL service 103 deploys resources for the user 119 (which may be dedicated to the user, e.g., to ensure data and privacy) by at circle (2) configuring a ML orchestrator 115 and at circle (3) configuring one or more object storage locations 117.

The ML orchestrator 115 may be a set of one or more applications, code, etc., that can launch an AutoML process on behalf of a user 119. The ML orchestrator 115, for example, may be code that is deployed as one or more functions of an on-demand code execution service 113, a set of one or more applications hosted by one or more compute instances provided by a hardware virtualization service, etc.

The one or more object storage locations 117 may be provided by a storage service 114 of the provider network 100, and may be folders, buckets, etc., that can store files or objects of various types. In some embodiments, the CIVIL service 103 creates a new object storage location 117 (e.g., a bucket) for the user 119 (e.g., under the user's account) and configures the object storage location such that it (via functionality provided by the storage service 114) sends an event notification message to another entity (e.g., directly to the ML orchestrator 115, into a queue, to a monitoring service (not shown) of the provider network 100, etc.) when any new object is saved to the location, when a particular type of object is saved to the location (e.g., a particular filetype or extension), etc. For example, in some embodiments the CML service 103 configures the object storage location 117 to directly send an event notification message to the ML orchestrator 115 it created upon any modification (e.g., a new file, a removed file, a changed file, etc.) made within the object storage location 117, which may identify the modification, the involved objects/files, etc. In other embodiments, though, the ML orchestrator 115 may periodically poll the storage service 114 or one or more object storage locations 117 to determine whether any modifications have been made, may receive events notifications from a monitoring service (that itself received event notifications from the one or more object storage locations 117), or another type of inter-system communication. Beneficially, though, in embodiments employing direct object storage location 117 to ML orchestrator 115 communications, the time to respond can be significantly reduced compared to other configurations, and thus the speed of service for the user can be faster.

Figure 2:
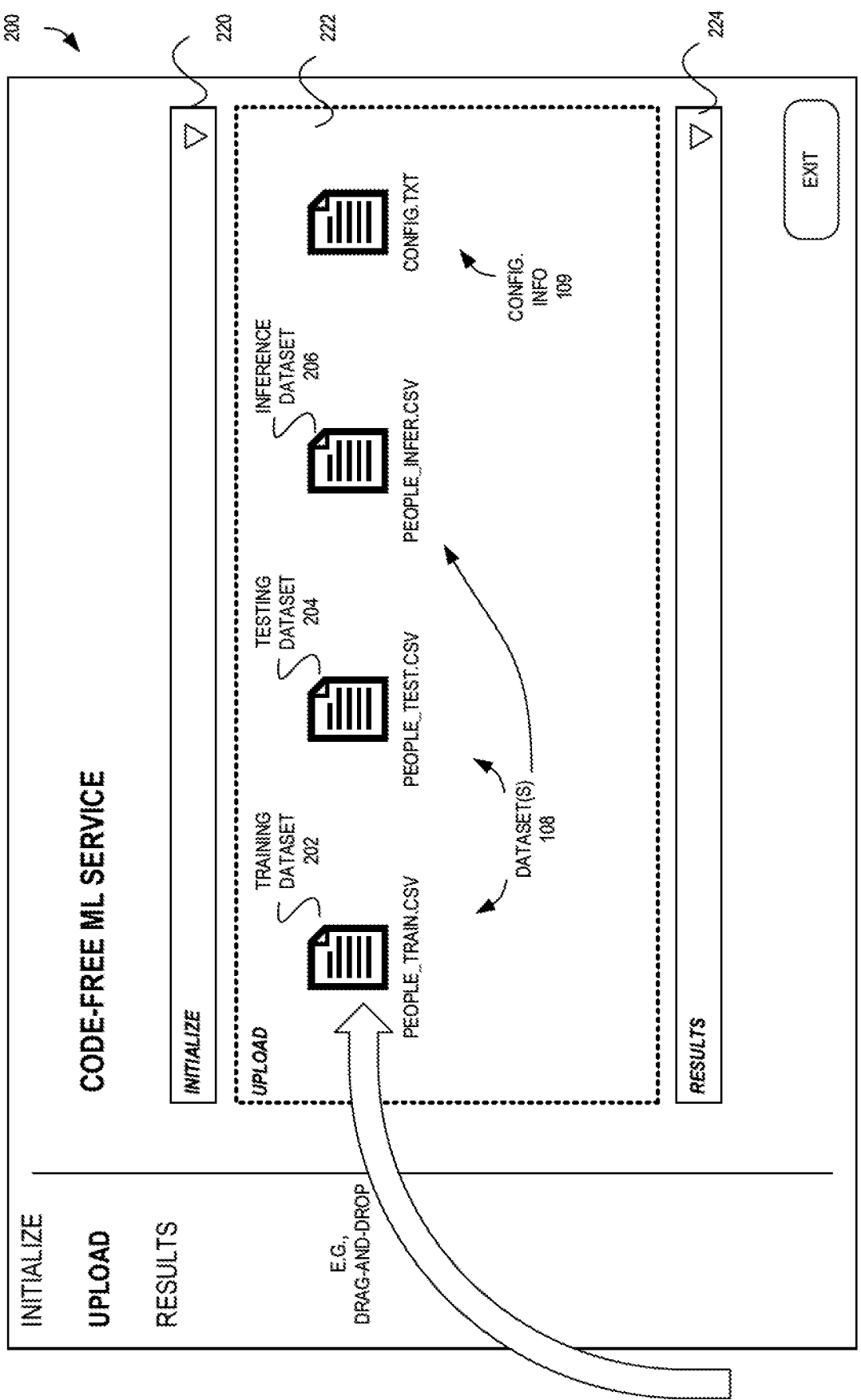
FIG. 2 is a diagram illustrating one exemplary user interface for initiating and managing code-free automated machine learning according to some embodiments.

The user 119 may then provide data for the automated ML model creation via one or more of circles (4A)-(4D). For example, FIG. 2 is a diagram illustrating one exemplary user interface 200 for initiating and managing code-free automated machine learning according to some embodiments. This and other user interfaces are shown as including various exemplary data fields and UI input elements (e.g., text input boxes, drop down boxes, radio buttons, checkboxes, etc.); however, it is to be understood that these are exemplary and representative of just one embodiment—many other data fields and elements can be implemented in various embodiments by those of skill in the art. Moreover, it is to be understood that other applications or systems (e.g., an application deployed within or outside the service provider network) may likewise provide data to initiate the automated ML model creation and/or utilization by programmatically storing data to the object storage location(s).

As illustrated, user interface 200 includes three panels 220/222/224, though in this example panels 220 and 224 are collapsed and their functionality is thus not shown here. In some embodiments, panel 220 may provide initialization UI elements allowing the user to initialize the system for use, e.g., to cause the CIVIL service 103 to deploy the architectural resources as described above.

Panel 222 of the UI 200 may provide an "upload" UI element to allow the user to provide various data objects for the AutoML exploration. In this example, the panel 222 may be a portion of the interface allowing for a user to drag-and-drop files therein, though it may also allow for the user to select it and then utilize a separate file selection UI element, etc.

In some embodiments, the user simply provides a training dataset 202 of interest to the user, here labeled as "PEOPLE_TRAIN.CSV." This training dataset 202 may include data from the user that the user wishes to have a ML model trained from and may encompass a nearly limitless variety of types of information. For example, a training dataset 202 may be a columnar dataset that includes rows (or entries, examples, etc.) of data values, where the data values may be arranged according to one or more columns (or attributes, fields, etc.) and may be of a same datatype or different datatypes. In some cases, the dataset 202 may include headings or other metadata describing names or datatypes of the columns, though in some cases this metadata may not exist. For example, the dataset 108 may have been provided by a user as a plaintext file (e.g., a comma-separated values (CSV) or tab-separated values (TSV) file), an Apache Parquet file or files, an exported database table or structure, an application-specific file such as a spreadsheet, etc.

Turning ahead to FIG. 4, which is a diagram illustrating exemplary user-provided training data, testing data, and configuration information for code-free automated machine learning according to some embodiments, the exemplary training dataset 202 includes a number of columns, each including a heading 404 and values 406—here, a column of "AGE" values, a column of favorite "COLOR" values, a column of "ZIP" code values, a column of "EDUCATION" values, a column of "HAIR" color values, and a column of "TARGET" values. In this case, the headings 404 for the columns are included, though this is not a strict requirement. This training dataset 202 thus includes a number of samples 410, where each sample includes zero or one or more values 406 for each of the column headings 404. The training dataset 202 may be named or designated in a specific manner allowing the ML orchestrator 115 to detect that it is, in fact, a testing dataset—e.g., it may have a filename portion (e.g., "_TRAIN") or extension or file that designates to the ML orchestrator 115 that it is a training dataset, it may include a first line of data (e.g., a string of "TRAIN" or "TRAINING") that designates to the ML orchestrator 115 that it is a training dataset, etc.

In some embodiments, the training dataset 202 itself is laid out in a specific way or includes information allowing for the ML orchestrator 115 (or another involved component of the system) to automatically determine a target variable 402 (e.g., a value to be inferred by the desired ML model). In various embodiments, this target variable 402 may be specified in one or multiple different ways, such as by including the target variable 402 last (among the columns), by including an identifier (e.g., an asterisk or other character(s) prepended, postpended, or inserted into the column name), by having a column with a particular name (e.g., ""CLASS" or "TARGET", etc.), etc. However, in other embodiments the training dataset 202 need not itself include this information and instead the user may provide or select it via interacting with the GUI. In this example, the user may be seeking to infer a favorite type of pizza for each person based on values associated with the person, such as their age, hair color, ZIP code, favorite color, etc.

Turning back to the interface of FIG. 2, in some embodiments the user may simply provide such a training dataset 202 and nothing else is required. However, in some embodiments the user may also provide other data, such as one or more of a testing dataset 204, an inference dataset 206, a configuration information 109 file, etc.

A testing dataset 204 may optionally be provided at a same time as a training dataset 202 (or even afterward, such as when a model based on the training dataset 202 has been created), and may be similar to the training dataset 202 in that it includes the same columns of values, including values for a target variable 402, which the ML orchestrator 115 can utilize to test the accuracy/performance of a ML model (or ML model pipeline) trained using the training dataset 202. For example, the ML orchestrator 115 may provide the testing dataset 204—along with the training dataset 202—to an AutoML system (e.g., an Automated ML Pipeline Generation System 102 ("AMPGS") discussed later herein, or to a model training application using an AutoML library 121) that can itself use the testing dataset 204 to examine the performance of ML models being trained. Alternatively, in some embodiments the ML orchestrator 115 can itself test a ML model/pipeline trained and selected by such an AutoML system, e.g., by generating inferences via the model using values of the non-target variable columns as input, and comparing the inference result generated by the model to the corresponding user-provided value of the target variable. Thus, results of the testing (e.g., accuracy values, details about samples that were successfully and/or unsuccessfully inferred, etc.) can be provided to the user, if desired, in some embodiments.

The testing dataset 204 file(s) may similarly designate to the ML orchestrator 115 that they are a testing dataset, e.g., via a filename or extension (or portion thereof) such as "_TEST", a value in the dataset, etc.

However, in some embodiments a testing dataset 204 need not be provided. Instead, the ML orchestrator 115 or it's backend AutoML system can divide up the training dataset 202 itself, e.g., by "holding" out some amount of the training samples (e.g., a percentage such as 20%, or a fixed number of samples) from use during training of a model, and then use these held-out samples for testing.

An inference dataset 206 may similarly be provided at a same time as a training dataset 202, be provided afterward (e.g., after a model has been trained and/or tested), or even be provided or updated multiple times thereafter (e.g., in a same file, or in multiple files). The inference dataset 206 may also be named or designated in some manner (e.g., an "_INFER" suffix for the filename, an extension or extension suffix, a flag, a user selection via a GUI element, etc.) to allow the ML orchestrator 115 to determine that it is a dataset with samples to be inferred. As shown in FIG. 4, the inference dataset 206 may include samples 412—usually without any target variable 402 or target variable values—that the user desires to have inferred. As discussed elsewhere, the ML orchestrator 115 may provide these samples 412 (individually, or in a batch manner) to a trained ML model/pipeline to be inferred, and the inferred values may be returned in a variety of ways, such as by writing the inferred values into the inference dataset 206 (e.g., into the target variable 402 column) or writing the inferred values into a new file or data structure (e.g., stored in a same or different storage location as the training, testing, and/or inference datasets), transmitting the inferred values to a device of the user (e.g., to be presented to the user via a GUI of some manner), sent to another application, etc.

A configuration information 109 file may similarly be provided before or at a same time as a training dataset 202. Although in some embodiments the CML service 103 enables users to create ML models/pipelines with little to no knowledge of ML whatsoever, the CIVIL service 103 in some embodiments is designed to also provide further control of and/or visibility into of the machine learning exploration processes to users willing or interested to do so. For example, although a student or non-technical businessperson could quickly and easily use the CML service 103 (e.g., by only providing a training dataset 202), the CIVIL service 103 can also be used by a more advanced user, such as a data scientist or software engineer, to explore the ML process and/or fine-tune it to their needs. Thus, a configuration information 109 file may be provided according to a specification that specifies parameters (e.g., in the form of attributes 430 and associated values 435) for use in controlling the AutoML process and/or model usage. Any number of ML-related or provider network type settings can be exposed in this manner to users, including but not limited to resource utilization limits (as shown in FIG. 4, a maximum number of training jobs to consider as part of the exploration, a maximum runtime per training job (e.g., in seconds or minutes), a maximum cost per exploration), compute resource reservation controls (e.g., a type of compute instance to be used for training jobs, a number of compute instances to use for training jobs), configurations related to the datasets (e.g., what type of identifier is used to designate a training dataset (e.g., a file "suffix"), what the suffix identifier is (e.g., the string "TRAIN" appearing in the extension), a type of the training dataset file (e.g., CSV), an identifier of what the target variable (column) name is (e.g., "PIZZA"), machine learning problem type values (e.g., what the problem type is (e.g., classification, regression, etc., or AUTO for autodetect), what objective metric to use in the training (e.g., "auto," mean square error (MSE), classification accuracy, logarithmic loss, area under curve (AUC), mean absolute error (MAE), root mean squared error (RMSE), root mean squared logarithmic error (RMSLE), R squared, F1 score, etc.), what algorithms are to be tested/used and/or what algorithms are not to be tested/used (e.g., random forest, K nearest neighbors, LightGBM, Catboost, neural networks, weighted ensemble, etc.), whether to attempt to create an ensemble model, which AutoML system to utilize (e.g., by providing an identifier associated with the AutoML training library 121 or AMPGS 102), etc. In some cases, an ensemble model can provide improved accuracy, e.g., via applying an ensemble approach that combines several base models to produce one optimal predictive model, such as via use of a bagging approach (e.g., building multiple models from different subsamples of the dataset), a random forest type approach, a boosting approach (e.g., building multiple models, where ones may learn to correct errors of other models), a stacking approach (e.g., a supervisor model or algorithm combines the predictions from multiple other models), or other approach known to those of skill in the art. In some embodiments the user may select "auto" (or the like, meaning "automatic") and thus the system may select its own desired types and/or quantities for these attributes, e.g., based on previous exploration runs and/or based on a user-provided budget.

Turning back to FIG. 1, the user 119 may in some embodiments provide data for the automated ML model creation (e.g., datasets 108 for training, testing, and/or inference, configuration information 109, etc.) via interacting with the CML service 103 through one or more UIs at circle (4A). For example, the user 119 may drag and drop these files into a UI element (e.g., panel 222 of UI 200), and the files are sent to the CML service 103, which itself places the files into the object storage locations 117 on behalf of the user at circle (4B).

In some embodiments, the user 119 may provide data that is incomplete or erroneous in some manner. The CIVIL service 103 may provide a notification back to the user to indicate the issue/error, or in some embodiments may be able to rectify the problem(s) on its own. For example, in some embodiments, if the user 119 provides a partially or completely un-labeled training dataset, the CML service 103 may engage with the user 119 to create a job for a labeling service 143 at circle (4C), which could be an active learning type system, a human labeling service, or the like, that can provide labels for these samples. In this manner, a user 119 beneficially might not need to provide labels for the target variable on their own and may use other systems to complete this task for them.

Alternatively, or additionally, at circle (4D), the user 119 may use an application 125 of the computing device to instead directly send the file(s) to the object storage location(s) 117, e.g., via an API or GUI interface provided by a storage service 114 in some embodiments.

As indicated, upon a modification to the object storage location 117, the storage service 114 (or object storage location 117 itself) may emit an event notification message directly or indirectly to the ML orchestrator 115 at circle (5), as described in detail earlier herein. The event notification message may identify the modified objects (e.g., files) such as the names and/or locations (e.g., a Uniform Resource Locator (URL)) and/or other attributes of added files, changed files, deleted files, etc.

The ML orchestrator 115 may then, based on the event notification message(s), determine what actions are to be performed. For example, if a new or updated training dataset is provided (optionally with a testing dataset and/or configuration information 109), the ML orchestrator 115 can initiate a ML model/pipeline exploration at circle (6A). For example, the ML orchestrator 115 may generate training code 123 using an AutoML library 121 (e.g., the AutoGluon AutoML Toolkit for Deep Learning, or similar application), and use this training code 123 to train one or more ML models/pipelines. As an example, some code 123 could reference the library 121 and call its APIs somewhat similar to as follows, based on the event notification message information:

```
// IMPORT LIBRARY
import autogluon as ag
from autogluon import TabularPrediction as task
...
// LOAD TRAINING DATA, CREATE A PREDICTOR BY TRAINING
MULITPLE MODELS
train_data = task.Dataset(file_path=PATH-TO-TRAINING-DATASET)
predictor = task.fit(train_data=train_data, label=TARGET-COLUMN,
output_directory=OUTPUT-LOCATION)
...
// PERFORM TESTING USING TESTING DATASET
test_data = task.Dataset(file_path=PATH-TO-TESTING-DATASET)
y_test = test_data[LABEL-COLUMN]
test_data_nolab = test_data.drop(labels=[LABEL-COLUMN],axis=1)
...
// MAKE PREDICTIONS, EVALUATE PERFORMANCE
y_pred = predictor.predict(test_data_nolab)
perf = predictor.evaluate_predictions(y_true=y_test, y_pred=y_pred,
auxiliary_metrics=True)
``` where the capitalized values PATH-TO-TRAINING-DATASET, TARGET-COLUMN, OUTPUT-LOCATION, PATH-TO-TESTING-DATASET, LABEL-COLUMN, etc., can be taken from the event notification message or created by the ML orchestrator 115 therefrom (e.g., by identifying the target column name, etc.).

As another, more simple example, the code 123 could reference the library 121 and call its APIs as follows to explore multiple ML models/pipelines:

```
from autogluon import TabularPrediction as task
predictor = task.fit(train_data=task.Dataset(file_path=
PATH-TO-TRAINING-DATASET),
label_column=TARGET-COLUMN)
```

The training code 123 may thus be executed, for example, via a model training system 120 described herein, via a standalone compute instance provided by a hardware virtualization service, or the like. In some embodiments, the training code 123 may write exploration artifacts 122 (e.g., pipeline code 123, model(s) 124) and/or inference data 111 to one or more object storage locations 117 at circle (6B), which may be the same as or different from the storage location where the user-provided datasets 108 and/or configuration information 109 are stored. For example, in some embodiments multiple object storage locations are created, where one object storage location is for user-provided inputs (e.g., configuration information 109, datasets 108) and one object storage location is for "outputs" of the system that could be provided to the user (e.g., inference data 111, exploration artifacts 122, etc.) or used by other systems. The ML orchestrator 115 may be notified of this writing of the exploration artifacts 122 (similar to the event notifications discussed with regard to circle (5)). The training code 123 may also directly or indirectly (such as via a monitoring service) provide a message back to the ML orchestrator 115 indicating a result of the training exploration.

The ML orchestrator 115 may also, based on the event notification message(s) received at circle (5), determine to perform a retraining of the models (e.g., when additional, different, or less training data is made available in the object storage location) via a similar technique. The ML orchestrator 115 may also, based on the event notification message(s) received at circle (5), determine to perform inference for a provided inference dataset, e.g., by at circle (7A) or (7B) obtaining (from artifacts 122) and deploying a model/pipeline (as pipeline code and/or inference models 126) to a model hosting system 140 or batch inference system 142, and calling these systems to generate inferences for the samples, which may be written back by the ML orchestrator 115 to one of the object storage location(s) 117 and/or provided to the user via another interface.

Figure 3:
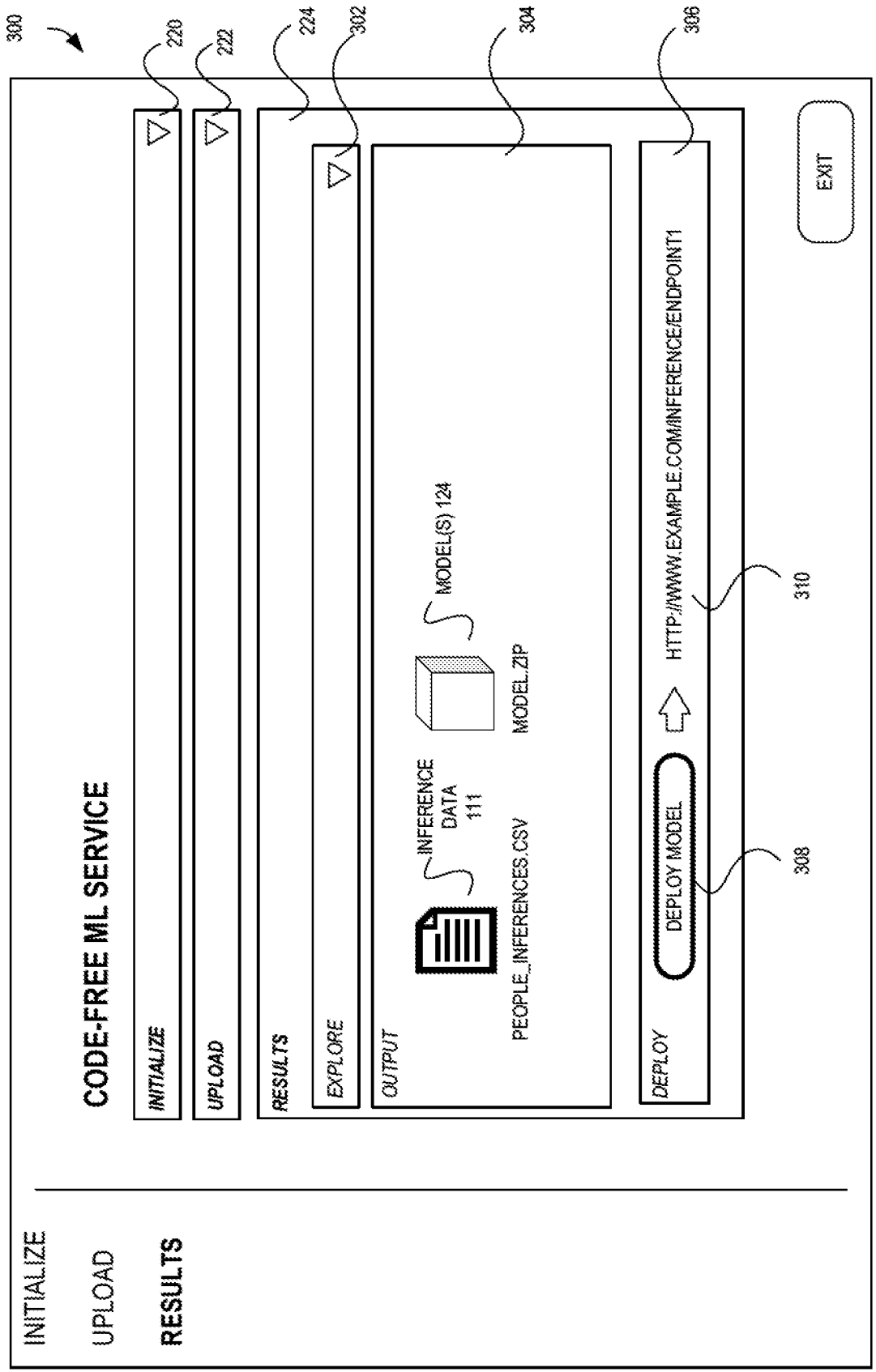
FIG. 3 is a diagram illustrating one exemplary user interface for obtaining results from code-free automated machine learning according to some embodiments.

FIG. 3 is a diagram illustrating one exemplary user interface 300 for obtaining results from code-free automated machine learning according to some embodiments. In some embodiments, the user 119 at circle (9A) may interact with the CML service 103 frontend to view this type of interface, and/or the user 119 at circle (9B) may be able to access the object storage locations 117 via another interface (e.g., provided by the storage service 114). In this UI 300, the initialization panel 220 and the upload panel 222 are collapsed (and thus their contents not currently visible), while the results panel 224 is expanded. This view may be presented when at least one training, testing, or inference job has been completed, and include one or more of an exploration panel 302 (collapsed here), an output panel 304, a deployment panel 306, etc. In this example, a training exploration job has concluded and model 124 artifacts have been stored in an object storage location (e.g., for one "best" model or for all models/pipelines)—this interface may display an icon for the model 124 artifacts allowing the user to download or view them. Further, an inference job has concluded and in this example, the inference data 111 results are shown as an icon with a file named PEOPLE_INFERENCES.CSV, which can be selected by the user to view and/or download them, depending on the implementation of the interface.

The deployment panel 306 may include a UI input element 308 (here, a button) allowing a user to deploy a model/pipeline (e.g., only a selected best model, or possibly any of the explored models) so the user can use it (e.g., via their own application issuing inference requests, or even via the CIVIL service 103, such as through UI 200). In this example, upon the user selecting the UI input element 308, the CIVIL service 103 may utilize the model 124 and/or pipeline code 123 to cause the model hosting system 140 to deploy it (as pipeline code and/or inference model(s) 126), obtain an identifier of an endpoint associated with the model/pipeline from the model hosting system 140, and optionally return this identifier 310 (here, an URL associated with the endpoint) via the UI 300. In some cases, then, the user 119 may again provide an inference dataset (e.g., similar to the operations shown regarding circle (1)), causing the inference dataset to be stored at the object storage location(s), triggering the ML orchestrator (similar to circle (5)) to generate inferences for these samples (similar to circle (7A)) by using an earlier-deployed model, deploying the best model, deploying a user-specified model, or the like.

In some embodiments, the CIVIL service 103 (via the ML orchestrator(s) 115) can alternatively, or additionally, utilize other AutoML systems for model exploration. For example, in some embodiments the CML service 103 at circle (6C) utilizes an Automated ML Pipeline Generation System ("AMPGS") 102, which could be implemented as something akin to Amazon's SageMaker Autopilot, to explore various ML pipelines.

Instead of requiring its users to decide which ML algorithm to use, the AMPGS 102 can automatically select multiple different ML algorithms from a list of high performing algorithms it natively supports and evaluate some or all of them. The AMPGS 102 can also automatically evaluate different hyperparameter settings for those algorithms in an effort to increase the resulting quality of ML model found. In some embodiments, its users do not need to be concerned with data cleaning or data preprocessing, as the AMPGS 102 can automatically apply different types of data preprocessors on the data before passing it through the ML algorithms to train ML models. The AMPGS 102 in some embodiments also makes details and artifacts of the ML pipelines it has evaluated, such as the corresponding source code, fully accessible to its users, allowing advanced users (such as data scientists) to quickly run baselines and iterate on the results to further improve model quality. These intermediate and/or final results can similarly be provided back via the ML orchestrator 115/CIVIL service 103 to the originating user 119, e.g., via one or more GUIs such as those shown in FIGS. 2, 6, 7, and/or 8, data files (e.g., exploration artifacts 122), etc.

In these cases, the ML orchestrator 115 may again provide information to the AMPGS 102 at circle (6C) based on its own configuration, analysis of provided datasets 180, and/or user-provided configuration information 109. For example, the ML orchestrator 115 may send one or more commands to the AMPGS 102 to configure an exploration, such as the identity of the target column from the dataset including values that should be inferred by the model (that is, that the model should ultimately output as its prediction given input data), exploration budget information, computing resource utilization settings, etc.

The AMPGS 102 may utilize one or both of a pipeline recommender system 112 and/or pipeline optimizer system 116. In some embodiments, the pipeline recommender system 112 is responsible for determining the set of ML pipelines to explore and be optimized by the pipeline optimizer system 116. The pipeline recommender system 112, in some embodiments, can analyze the provided training dataset and infer one or more of the probabilistic schema of the data set, target leakage, feature importance, the type of ML problem (e.g., classification, regression, etc.) based on the user-identified target column, etc. The pipeline recommender system 112 can use this dataset provided by the user and knowledge learned from metadata collected to identify a promising and diverse set of feature processing pipelines to apply to the customer dataset along with the code for the feature processing model. The pipeline recommender system 112 can also recommend the hardware (compute instance type and count), identifiers of which hyperparameters to tune (and optionally their effective search space), and the degree of parallelization that the pipeline optimizer system 116 should use when exploring the ML pipelines. Thereafter, the pipeline optimizer system 116 can use the pipelines recommended by pipeline recommender system 112 to start an optimization job (e.g., using model training system 120), which typically involves running multiple training jobs to identify the most performant ones. As the optimization job progresses, the pipeline optimizer system 116 can discard the low-performing models and can tune the hyperparameters of the most performant ones.

Figure 5:
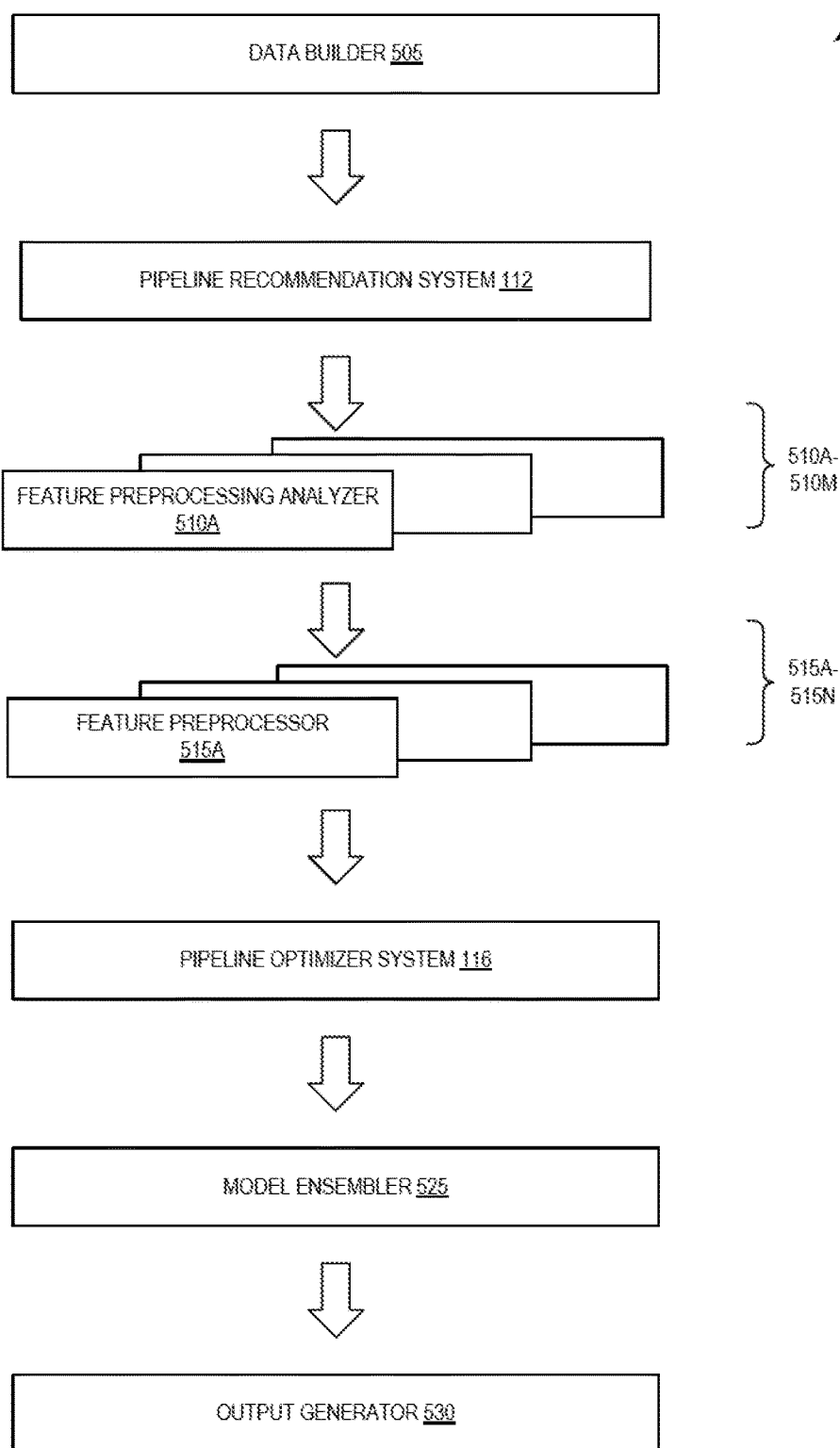
FIG. 5 is a diagram illustrating an exemplary set of processing jobs for automated machine learning pipeline exploration and deployment according to some embodiments.

For example, the operations of the AMPGS 102 (and the pipeline recommender system 112 and/or pipeline optimizer system 116) can be implemented as shown with regard to FIG. 5, which is a diagram illustrating an exemplary set of processing jobs for automated machine learning pipeline exploration and deployment according to some embodiments.

At block 505, a data builder component of the AMPGS 102 can obtain the dataset (e.g., by sending a request to a storage service based on a provided resource identifier) and perform preliminary operations with the dataset. For example, in some embodiments the data builder will split the dataset into three portions—one for training, one for validation, one for testing. In some embodiments, each of the three portions are equivalent in size (e.g., a same number of rows or a very similar number of rows (as in 334, 333, and 333 rows given a dataset of 1,000 rows)), though in other embodiments the portions are of dissimilar sizes (e.g., the training dataset may be much larger than either the validation or testing datasets). The preliminary operations may also include generating metadata describing the dataset (e.g., a total number of rows, a number of columns, data types of the columns, value distributions and other statistics based on values of the columns) that can be used as part of later processing, cleaning the dataset, or the like.

Next, the pipeline recommender system 112 can analyze the dataset (e.g., via use of one or more ML models along with the target column of the dataset, etc.) to recommend pipelines (a combination of one or more preprocessing tasks and a machine learning algorithm) to explore. For example, the pipeline recommender system 112 may utilize one or more ML models that have been trained to identify particular pipeline types that have worked well for particular datasets based on characteristics of those datasets (e.g., numbers and/or types of the columns, type of column to be inferred, etc.). Additionally, or alternatively, the pipeline recommender system 112 may use a database (or other data structure) of prior pipelines (and characteristics of the involved datasets) and compare the corresponding dataset/inference characteristics of the current dataset to identify the most similar historic pipelines, which can be suggested.

Additionally, or alternatively, the pipeline recommender system 112 may generate a number of different preprocessing pipelines (and corresponding training datasets) according to "strategies" that have been configured—e.g., a "baseline" strategy that will 1-hot encode (1HE) all categorical variables, median-impute null values with indicators; a "quadratic" strategy that will hash-encode any detected categorical variables, bucketize numeric features, and add cartesian-product features for predictive feature combinations: instance-type×instance-count, num layers×instance-type, dataset size×num layers; a "log bucketize" strategy that will hash-encode any categorical variables, bucketize numeric variables, and log-transform all numerics. For example, a feature processing pipeline may be generated using two machine learning jobs, which may be performed using a batch inference system 142 (that can train and/or host machine learning models in a batch manner): a training job to learn the transformations, and then a batch processing job to apply the transformation to the dataset to generate transformed datasets for use in exploring different ML models.

The pipeline recommender system 112 may identify a fixed number of pipelines to explore or a number provided by the user via the configuration information. As one example, the pipeline recommender system 112 may recommend up to ten pipelines to explore, such as (1) "apply one-hot encoding and principal component analysis (as the feature preprocessors/transforms) followed by use of the 'XGBOOST' algorithm with hyperparameter tuning", (2) "apply one-hot encoding and principal component analysis (as the feature preprocessors/transforms) followed by use of a 'linear learner' algorithm with hyperparameter tuning", (3) "apply principal component analysis (as the feature preprocessor/transform) followed by use of the 'XGBOOST' algorithm with hyperparameter tuning", and the like.

In some embodiments, after the pipeline recommender system 112 identifies different ML pipelines to be evaluated, a number of these pipelines explored, per configuration (of the CIVIL service 103 and/or user via configuration information 109 file). Thus, the exploration may proceed with the complete exploration, portions of the exploration (e.g., proceed with only some of the suggested pipelines, run only some portions of one pipeline), etc.

Assuming that the full exploration is to be continued, with reference to FIG. 5, a feature preprocessing analyzer 510A (e.g., each implemented by a separate one or more compute instance(s)) may run for each distinct preprocessing step/transform identified within the recommended ML pipeline plans. Each feature preprocessing analyzer 510A-510M may perform an initialization of a preprocessing task so that the task can be later implemented by a feature preprocessor 515A-515N, and this analysis may be performed at least partially in parallel.

For example, a feature preprocessing analyzer 510A for one-hot encoding may run a ML job to determine how many columns it should produce. It might be the case that a column of a dataset has 10,000 unique values, where many of these values are only referenced once or twice. Accordingly, the feature preprocessing analyzer 510A may determine to only generate columns for the top X (e.g., 200) values and one column as a "catch-all" for any other value. Thus, the feature preprocessing analyzer 510A will perform this analysis, which may include identifying what all distinct categories are referenced within a column, what the counts of each of these values are, etc., to ultimately determine to what columns should be generated. Similar types of preprocessing analysis can be performed for other types of pipeline preprocessing tasks, e.g., for principal component analysis there is a need to learn the result (e.g., which features should be used), etc.

Thereafter, the actual preprocessing can be performed by a set of feature preprocessors 515A-515N, where each preprocessor may implement a particular preprocessing step, or may implement multiple preprocessing steps (e.g., for one pipeline). The feature preprocessors 515A-515N may thus use the data from the feature preprocessing analyzers to apply the preprocessing operations/transforms to the dataset (e.g., a row at a time), optionally at least partially in parallel, to yield a transformed output dataset (or portion thereof).

Notably, in some embodiments during the preprocessing analysis and/or the actual preprocessing, the AMPGS 102 may provide updates to the user 119 (e.g., via an application 125 such as a console 105 and/or interactive code application 107 such as a Jupyter Notebook), who may view the intermediate results, halt these tasks (or the entire ML pipeline exploration), modify the tasks, etc.

Next, the pipeline optimizer system 116 can utilize the preprocessed datasets and pipeline recommendations (including identifiers of the particular ML algorithms to be used to generate ML models) and can cause the multiple ML models to be trained accordingly, e.g., by calling a model training system 120 described herein (optionally in parallel), utilizing a ML framework or library, etc., according to any user-stipulated configuration parameters (e.g., how many trials are to be run in total, how many trials can be run at a time, what type of compute instances to use, etc.). The result of each training includes the model artifacts, together with the value of the objective metric to be optimized. The pipeline optimizer system 116 may use this information, e.g., via use of another one or more ML models or databases, to identify additional ML pipeline variants to test (having different hyperparameter values, for example) that are likely to result in a good model. Such hyperparameter tuning systems and techniques are known to those of skill in the art and can be utilized to work to repeatedly find better pipelines.

Notably, in some embodiments during these training trials, the AMPGS 102 may provide updates to the user 119 via an application 125 (e.g., via a console 105 and/or interactive code application 107 such as a Jupyter Notebook), who may view the intermediate results, halt certain trainings (or the entire ML pipeline exploration), etc. For example, this may occur via the exploration panel 302 of the results panel 224 shown in FIG. 3.

A model ensembler 525 may also be utilized to create one or more ensemble models, if desired by the user or configured by the system, based on use of ones of the explored models. For example, as indicated above, multiple models can be used in an ensemble using one or more ensemble techniques known to those of skill in the art (e.g., using some sort of aggregation or selection of outputs). Based on all results, an output generator 530 may produce output in the form of one or more of a comprehensive result in the form of updated result data to be viewed by the user, a package of the pipeline exploration artifacts 122 (e.g., code 123 for implementing a preprocessing pipeline, which may include ML models, and/or inference model(s) 124) stored at a storage location to be later obtained by the user or another application, results stored to a database, etc.

In some scenarios, a user 119 may view the results of the exploration and choose to deploy a pipeline for use. In this case, the user's computing device 104 may issue a command to deploy a particular pipeline (e.g., via a deployment panel 306), and in response the CIVIL service 103 (e.g., ML orchestrator 115) or AMPGS 102 may send one or more commands (e.g., API calls) to a model hosting system 140 described further herein to "host" the pipeline—e.g., launch or reserve one or more compute instances, run pipeline code 126, configure endpoints associated with the pipeline (that can receive inference requests from outside clients and provide the requests to the pipeline), etc. As one example, the commands may include a "create model" API call that combines code for the model (e.g., inference code implemented within a container) along with model artifacts (e.g., data describing weights associated with various aspects of the model) to yield a model that can be hosted (e.g., by a model hosting system 140 or batch inference system 142), where the create model request may include one or more of a name for the model, an identifier of a container with inference code, one or more identifiers of other containers in the inference pipeline, a set of permissions or roles for the model when executing, a set of user-defined tags to be associated with the model, or the like. The command(s) may also include a "create endpoint" (or "create transform job" in the case of batch inference) API call that deploys all pipeline components needed for the model (e.g., sets up the container(s) needed for preprocessing, the container(s) needed for the actual inference, associated routing, etc.).

Thus, as indicated above, the CIVIL service 103 (e.g., ML orchestrator 115) or AMPGS 102 may send one or more commands (e.g., API calls) to a batch inference system 142 to "host" the pipeline for use in performing batch inferences. The batch inference system 142 may be implemented similarly to the model hosting system 140 described herein, but may be optimized for performing inferences in batch—e.g., via input data stored at a storage service location, storing results back to a storage location, etc., as opposed to performing real-time synchronous inference. This deployment or deployments may also be performed automatically upon the conclusion of the pipeline exploration process, where the AMPGS 102 can automatically deploy a "best" performing pipeline. Thereafter, a client application inside the provider network (such as one executed by an application run by an internal service such as a hardware virtualization service or a code execution service) or outside the provider network (e.g., by a computing device 104) may issue inference requests to the endpoint associated with the deployed pipeline code 126, enabling the pipeline to generate an inference and return that result back to the application.

Figure 6:
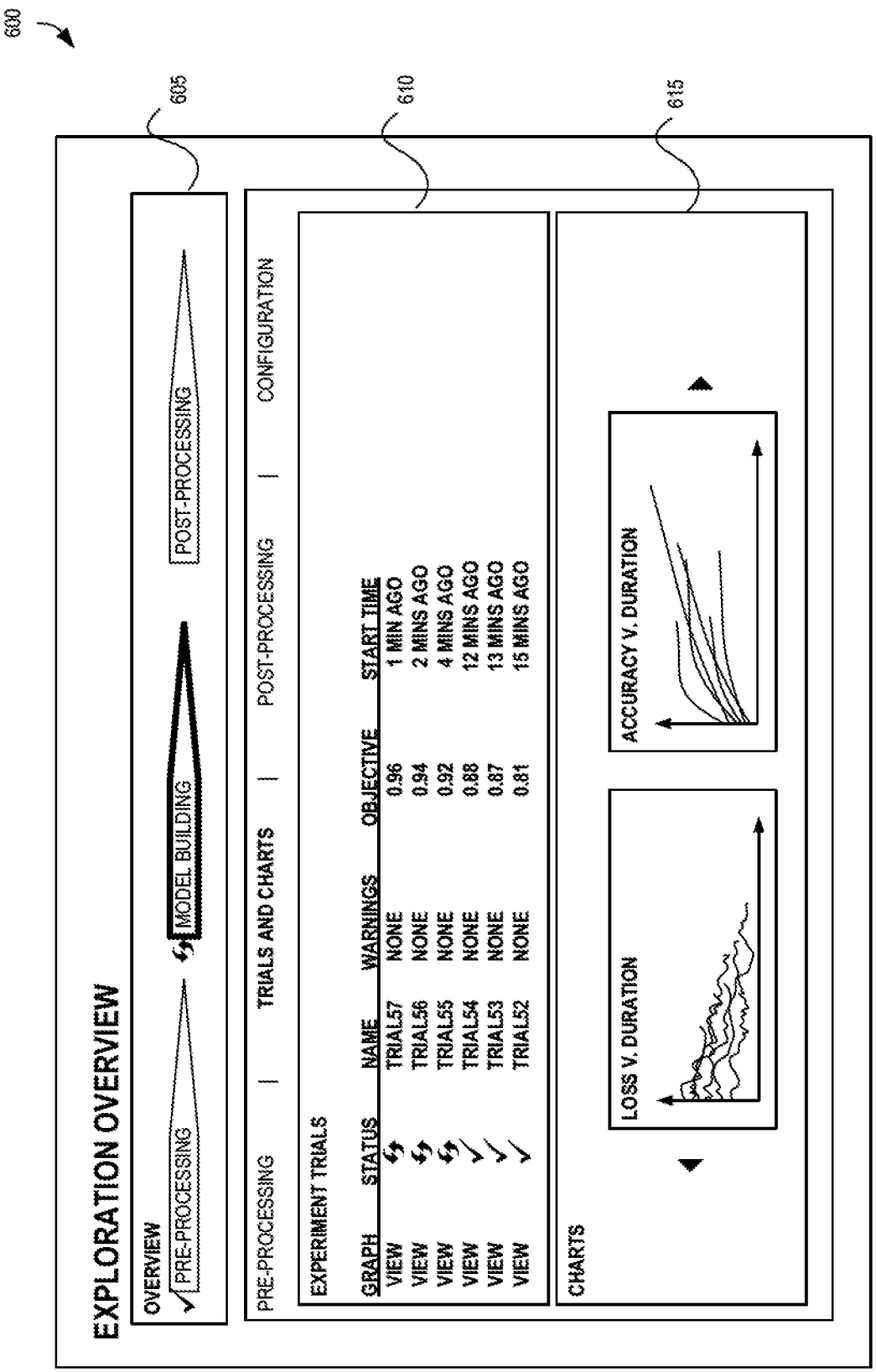
FIG. 6 is a diagram illustrating one exemplary user interface for monitoring trials of an automated machine learning pipeline exploration according to some embodiments.

As indicated throughout, the ongoing status and/or intermediate (or final) results of the exploration can be provided to the user in a "white box" fashion, allow the user full visibility into what is proposed to be done, what is actually being done, and what has resulted. For example, FIG. 6 is a diagram illustrating one exemplary user interface 600 for monitoring trials of an automated machine learning pipeline exploration according to some embodiments. In this user interface 600, a first panel 605 displays the stage of the exploration—e.g., the pre-processing phase, the model building phase, a post-processing phase, etc. In this example, the model building phase is ongoing.

A second panel 610 shows an overview of the "trials" (or model trainings) for the exploration—here, three models are actively being trained (referred to as TRIAL55, TRIAL56, and TRIAL57), and ones of these columns in the table may be selectable to view additional information about each trial, ranging from graphs of their intermediate results, details of any warnings/issues, details of the particular trial (e.g., identifiers of the preprocessing, model algorithm type, hyperparameters being tested), etc. A third panel 610 shows various charts depicting results of the entire exploration so far—here, the loss of the models over time as the models are trained, the accuracy of the models over time as the models are trained, etc.

Figure 7:
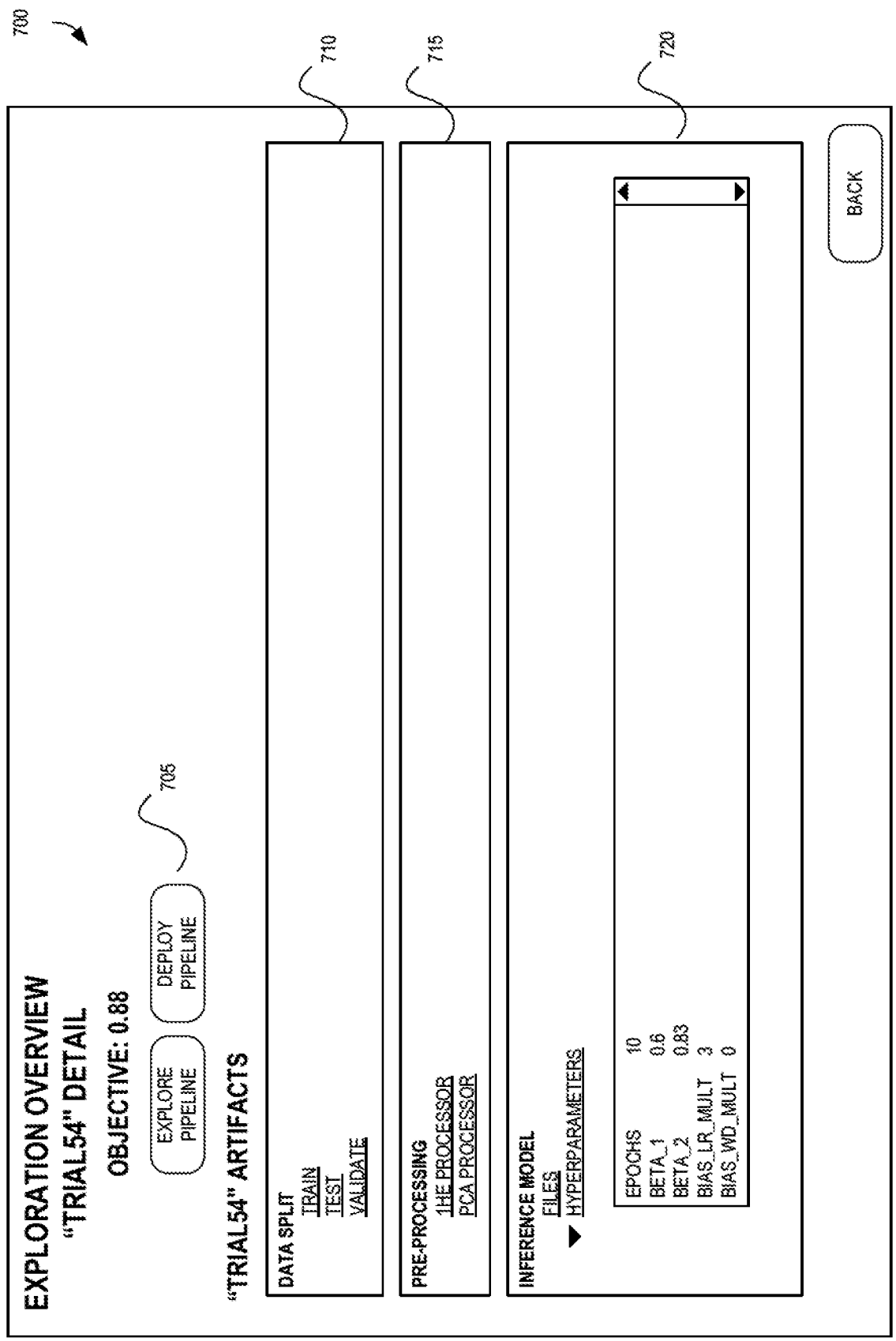
FIG. 7 is a diagram illustrating one exemplary user interface for viewing trial results of an automated machine learning pipeline exploration according to some embodiments.

For additional detail, FIG. 7 is a diagram illustrating one exemplary user interface 700 for viewing trial results of an automated machine learning pipeline exploration according to some embodiments. This user interface 700 may be displayed, for example, when a user selects a particular trial in the second panel 610 of FIG. 6 and presents additional detail about a particular trial. In this example, a first panel 705 shows the trial name while presenting user interface input elements (here, buttons) allowing the user to further explore the pipeline and/or deploy the pipeline. A second panel 710 allows the user to view/download each set of data resulting from the split of the dataset, while a third panel 715 allows the user to view/download the pre-processing related information (e.g., preprocessing code—such as a preprocessing ML model—and/or resulting dataset) and a fourth panel 720 allows the user to view/download other pipeline artifacts (e.g., model code/weights, hyperparameter values).

FIG. 8 is a diagram illustrating one exemplary interactive code exploration user interface 800 for viewing and/or modifying an automated machine learning pipeline exploration according to some embodiments. As shown in FIG. 8, an interactive code exploration may be presented to a user (e.g., via a web browser as a web application) that allows the user to explore code, run code, modify and run code, etc. In some embodiments, code for performing ML pipeline exploration may be presented to users to provide the users visibility into what particular pipelines are recommended to be tested, what preprocessing operations will be used, etc. Moreover, users can "run" this code (e.g., via selecting a user interface element such as a button, causing the application to send a request to the provider network for the code to actually be executed) in its original form or in modified form (e.g., by the user editing the code). In this example, the interactive code exploration user interface 800 includes a first code panel 805 including some definitional code, e.g., giving the exploration a name, setting up storage location paths, importing code from libraries, and the like.

The interactive code exploration user interface 800 also includes a second code section 810 that defines multiple different ways to preprocess a training dataset. In this example, the dataset is configured with the code to preprocess the dataset in a variety of different ways to compare which technique(s) work best, which may include training feature processing models, and then running "batch" transform jobs to actually apply the transformations.

As shown, a first pipeline "FP_BASELINE" is defined with a first "FP0" step, which is defined (as a training job to learn the transformations) with values for a source directory, instance types and counts, and other non-illustrated values such as an ML framework version to be used, a set of tags to be applied, an identifier of a feature processing strategy (e.g., a baseline strategy that performs a 1-hot encoding of all categorical variables and does a median-impute null values with indicators; a quadratic strategy that does a hash-encoding of categorical variables, bucketization of numerics, addition of cartesian-product features for predictive feature combinations; or other strategies) to use. A complimentary "BT0" step for the first pipeline is also defined (as a batch processing job to apply the transformations to the dataset), which may define such values as an instance type, instance count, an output path, a set of tags, and the like. These two steps together may form one feature processing pipeline, and many pairs of these steps (that is, many feature processing pipelines) may be defined to create multiple different feature processing pipelines.

The interactive code exploration user interface 800 may also include a section 815 to display results of the pipelines being run, and finally, a code section 820 to define different combinations of machine learning models and pipelines, each including values for a name, an ML algorithm to use, a set of hyperparameters, an identifier of a storage location storing a particular set of input values generated by one of the feature processing pipelines, and the like.

Figure 9:
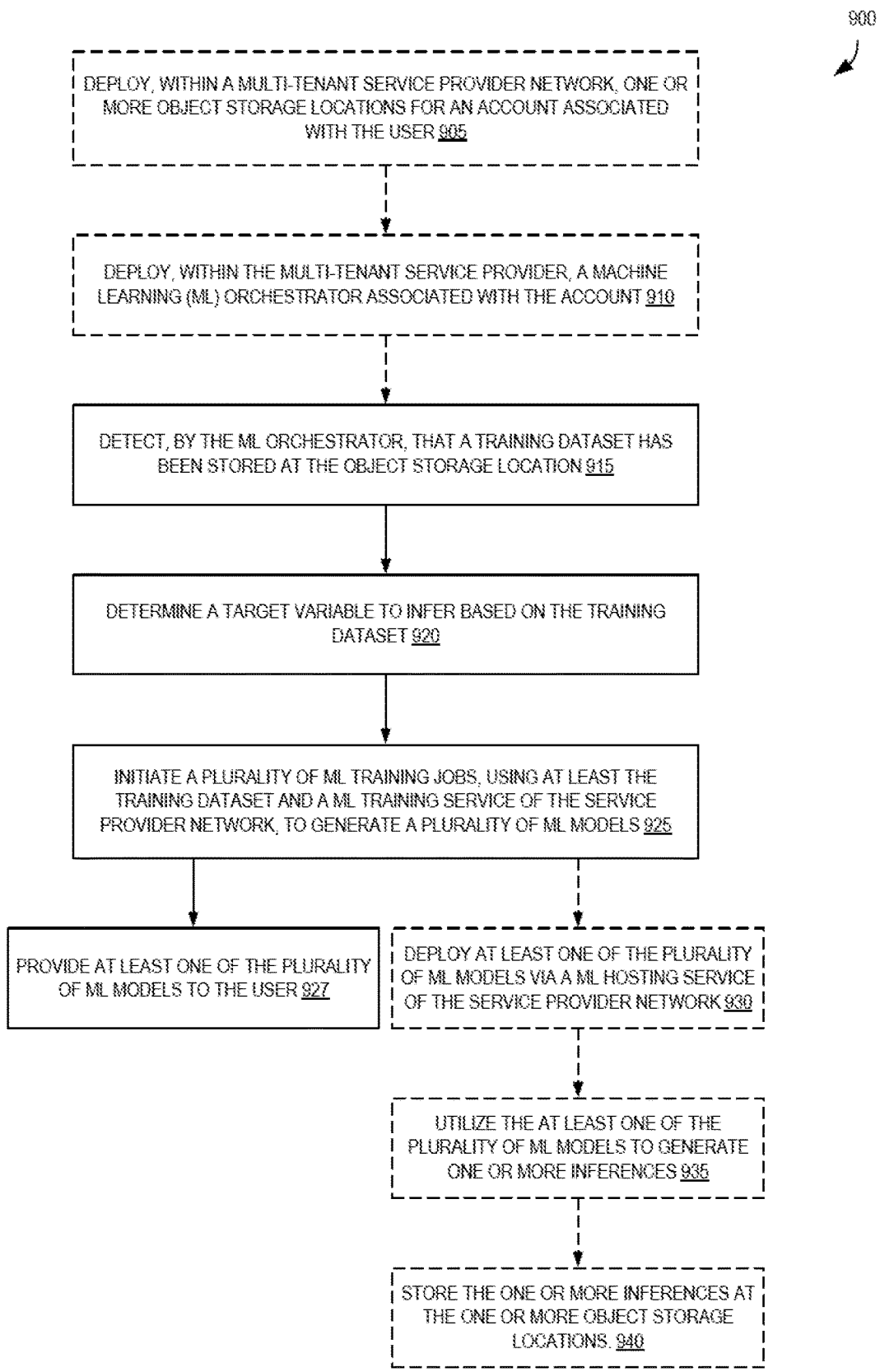
FIG. 9 is a flow diagram illustrating operations of a method for code-free automated machine learning according to some embodiments.

FIG. 9 is a flow diagram illustrating operations of a method for code-free automated machine learning according to some embodiments. Some or all of the operations 900 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 900 are performed by the CML service 103 and/or ML orchestrator 115 of the other figures.

The operations 900 optionally include, at block 905, deploying, within a multi-tenant service provider network, one or more object storage locations for an account associated with a user. Block 905 may occur responsive to a user interacting with the service provider network via a console or other web-based application. The user may have selected a user interface input element indicating that they seek to utilize a code-free automated ML service. The object storage location(s) may be folders or buckets provided by a storage service of the service provider network.

Optionally, at block 910, the operations 900 include deploying, within the multi-tenant service provider, an ML orchestrator associated with the account. The ML orchestrator may be code deployed as a function within an on-demand code execution service of the service provider network. The one or more object storage locations may be configured to, upon a modification to the storage location(s)—such as a write of a file, a deletion of a file, a modification of a file, etc.—to send an event notification to the ML orchestrator, which may identify the changed file/object.

The operations 900 include, at block 915, detecting, by the ML orchestrator, that a training dataset has been stored at the object storage location. The detecting may comprise receiving an event notification message that was originated by the object storage locations/storage service providing the object storage locations, and determining that the event notification message includes an identifier of a file known (e.g., per a known extension, etc.) to be a training dataset. The training dataset may include one or more samples, where each sample includes one or more values corresponding to one or more attributes.

At block 920, the operations 900 include determining a target variable to infer based on the training dataset. The determination may include identifying a particular "column" name or format within the training dataset, e.g., a name of "class" or a name having a matching pattern (e.g., having an asterisk or some other character(s) in the name), etc.

The operations 900 include, at block 925, initiating a plurality of ML training jobs, using at least the training dataset and a ML training service of the service provider network, to generate a plurality of ML models. The initiating may include use of a model training system of the provider network and may include causing an application including (or otherwise utilizing) an AutoML library to begin a model exploration/training task. The initiating may include using an AutoML service provided by the service provider network to begin an AutoML process. The training operations may be controlled by configuration information data provided by the user, e.g., via a UI, and stored at the one or more storage locations.

In some embodiments, the operations 900 include, at block 927, providing at least one of the plurality of ML models to the user, which may include providing a UI to the user allowing the user to download one or more of the models, view results/metrics corresponding to the model(s), etc.

At block 930, the operations 900 optionally include deploying at least one of the plurality of ML models via a ML hosting service of the service provider network. Block 930 may include sending one or more messages (e.g., API requests) to create a model and/or deploy a model, and receiving an identifier from the ML hosting service that is associated with the deployed model/pipeline.

The operations 900 include, at block 935, utilizing the at least one of the plurality of ML models to generate one or more inferences. Block 935 may be based on a inference dataset provided by the user, and may include reading one or more samples from the inference dataset, and sending the one or more samples (e.g., using the identifier) to be used as input to the model(s). The one or more inferences may be stored by the ML hosting service to a storage location (e.g., a same or different storage location than the one(s) storing a training dataset and/or inference dataset) or returned from the ML hosting service (e.g., to a ML orchestrator) in a message.

At block 940, the operations 900 optionally include storing the one or more inferences at the one or more object storage locations, which may be performed by the ML hosting service or the ML orchestrator. Thereafter, the one or more inferences may be provided back to the user, e.g., via a UI provided by the CML service 103 or model hosting system, for example. The one or more inferences may additionally or alternatively be provided to an application within the service provider network or outside of the service provider network.

Figure 10:
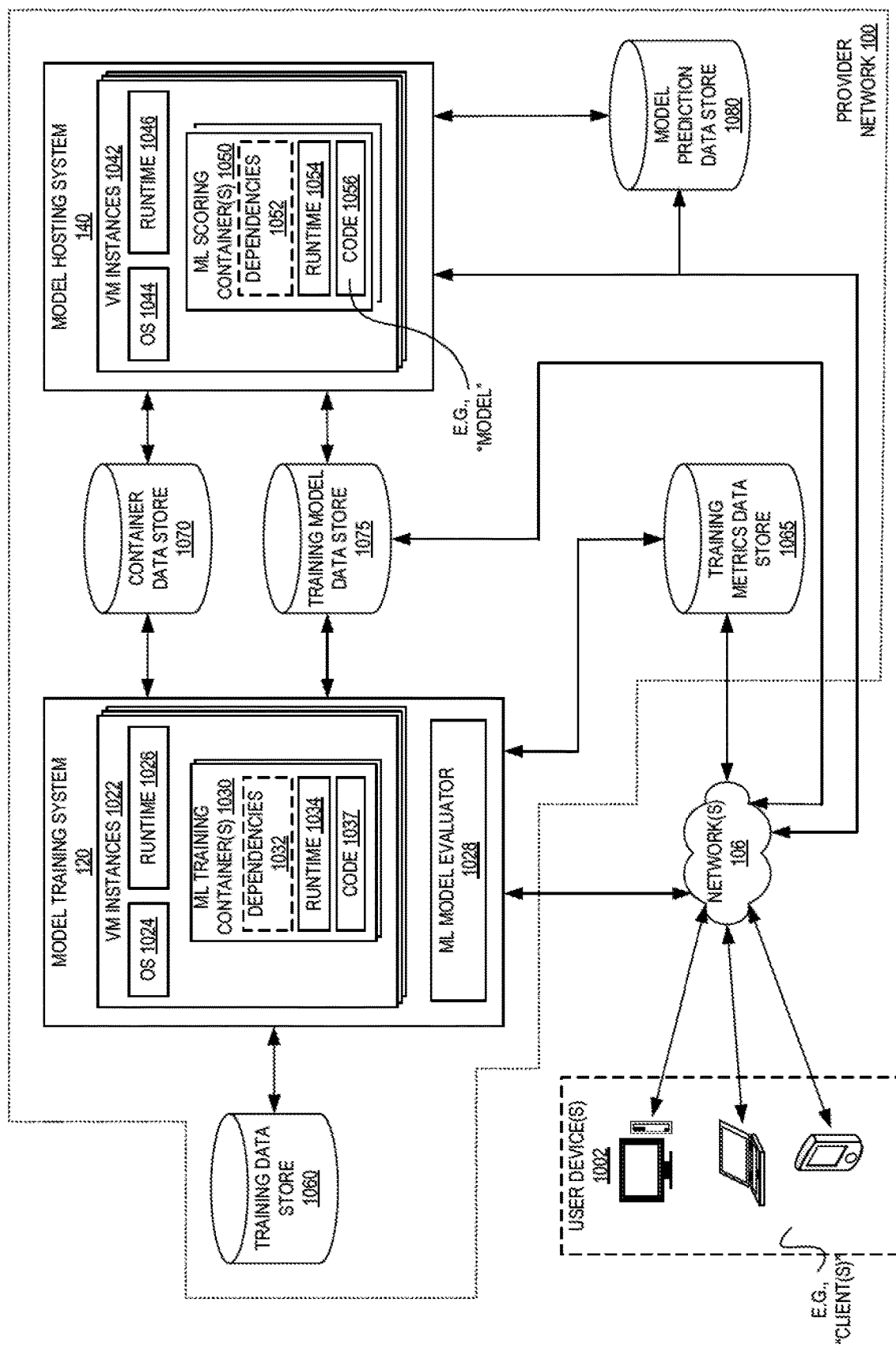
FIG. 10 is a block diagram of an illustrative operating environment in which machine learning models are trained and hosted according to some embodiments.

FIG. 10 is a block diagram of an illustrative operating environment in which machine learning models are trained and hosted according to some embodiments. The operating environment includes end user devices 1002 (e.g., a PC or mobile device such as computing device 104), a model training system 120, a model hosting system 140, a training data store 1060, a training metrics data store 1065, a container data store 1070, a training model data store 1075, and a model prediction data store 1080. A machine learning service 110 described herein may include one or more of these entities, such as the model hosting system 140, model training system 120, etc.

In some embodiments, users, by way of user devices 1002, interact with the model training system 120 to provide data that causes the model training system 120 to train one or more machine learning models. A machine learning model, generally, may be thought of as one or more equations that are "trained" using a set of data. In some embodiments, the model training system 120 provides ML functionalities as a Web service, and thus messaging between user devices 1002 and the model training system 120 (or provider network 100), and/or between components of the model training system 120 (or provider network 100), may utilize HTTP messages to transfer data in a machine-readable file format, such as XML or JSON.

The user devices 1002 can interact with the model training system 120 via frontend 1029 of the model training system 120. For example, a user device 1002 can provide a training request to the frontend 1029 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 1002, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 1002 may provide, in the training request, an algorithm written in any programming language. The model training system 120 packages the algorithm into a container (optionally with other code, such as a "base" ML algorithm supplemented with user-provided code) that is eventually loaded into a virtual machine instance 1022 for training a machine learning model, as described in greater detail below. For example, a user, via a user device 1002, may develop an algorithm/code using an application (e.g., an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 1002 provides, in the training request, an indicator of a container image (e.g., an indication of an address or a location at which a container image is stored). For example, the container image can be stored in a container data store 1070, and this container image may have been previously created/uploaded by the user. The model training system 120 can retrieve the container image from the indicated location and create a container using the retrieved container image. The container is then loaded into a virtual machine instance 1022 for training a machine learning model, as described in greater detail below.

The model training system 120 can use the information provided by the user device 1002 to train a machine learning model in one or more pre-established virtual machine instances 1022 in some embodiments. In particular, the model training system 120 includes a single physical computing device or multiple physical computing devices that are interconnected using one or more computing networks (not shown), where the physical computing device(s) host one or more virtual machine instances 1022. The model training system 120 can handle the acquisition and configuration of compute capacity (e.g., containers, instances, etc., which are described in greater detail below) based on the information describing the computing machine on which to train a machine learning model provided by the user device 1002. The model training system 120 can then train machine learning models using the compute capacity, as is described in greater detail below. The model training system 120 can automatically scale up and down based on the volume of training requests received from user devices 1002 via frontend 1029, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 1022 are utilized to execute tasks. For example, such tasks can include training a machine learning model. As shown in FIG. 10, each virtual machine instance 1022 includes an operating system (OS) 1024, a language runtime 1026, and one or more ML training containers 1030. Generally, the ML training containers 1030 are logical units created within a virtual machine instance using the resources available on that instance and can be utilized to isolate execution of a task from other processes (e.g., task executions) occurring in the instance. In some embodiments, the ML training containers 1030 are formed from one or more container images and a top container layer. Each container image may further include one or more image layers, where each image layer represents an executable instruction. As described above, some or all of the executable instructions together represent an algorithm that defines a machine learning model. Changes made to the ML training containers 1030 (e.g., creation of new files, modification of existing files, deletion of files, etc.) are stored in the top container layer. If a ML training container 1030 is deleted, the top container layer is also deleted. However, the container image(s) that form a portion of the deleted ML training container 1030 can remain unchanged. The ML training containers 1030 can be implemented, for example, as Linux containers (LXC), Docker containers, and the like.

The ML training containers 1030 may include individual a runtime 1034, code 1037, and dependencies 1032 needed by the code 1037 in some embodiments. The runtime 1034 can be defined by one or more executable instructions that form at least a portion of a container image that is used to form the ML training container 1030 (e.g., the executable instruction(s) in the container image that define the operating system and/or runtime to run in the container formed from the container image). The code 1037 includes one or more executable instructions that form at least a portion of a container image that is used to form the ML training container 1030. For example, the code 1037 includes the executable instructions in the container image that represent an algorithm that defines a machine learning model, which may reference (or utilize) code or libraries from dependencies 1032. The runtime 1034 is configured to execute the code 1037 in response to an instruction to begin machine learning model training. Execution of the code 1037 results in the generation of model data, as described in greater detail below.

In some embodiments, the code 1037 includes executable instructions that represent algorithms that define different machine learning models. For example, the code 1037 includes one set of executable instructions that represent a first algorithm that defines a first machine learning model and a second set of executable instructions that represent a second algorithm that defines a second machine learning model. In some embodiments, the virtual machine instance 1022 executes the code 1037 and trains all of the machine learning models. In some embodiments, the virtual machine instance 1022 executes the code 1037, selecting one of the machine learning models to train. For example, the virtual machine instance 1022 can identify a type of training data indicated by the training request and select a machine learning model to train (e.g., execute the executable instructions that represent an algorithm that defines the selected machine learning model) that corresponds with the identified type of training data.

In some embodiments, the runtime 1034 is the same as the runtime 1026 utilized by the virtual machine instance 1022. In some embodiments, the runtime 1034 is different than the runtime 1026 utilized by the virtual machine instance 1022.

In some embodiments, the model training system 120 uses one or more container images included in a training request (or a container image retrieved from the container data store 1070 in response to a received training request) to create and initialize a ML training container 1030 in a virtual machine instance 1022. For example, the model training system 120 creates a ML training container 1030 that includes the container image(s) and/or a top container layer.

Prior to beginning the training process, in some embodiments, the model training system 120 retrieves training data from the location indicated in the training request. For example, the location indicated in the training request can be a location in the training data store 1060. Thus, the model training system 120 retrieves the training data from the indicated location in the training data store 1060. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 1022 training the machine learning model. Once the virtual machine instance 1022 has applied and used the retrieved portion or once the virtual machine instance 1022 is about to use all of the retrieved portion (e.g., a buffer storing the retrieved portion is nearly empty), then the model training system 120 can retrieve a second portion of the training data and provide the second retrieved portion to the virtual machine instance 1022, and so on.

To perform the machine learning model training, the virtual machine instance 1022 executes code 1037 stored in the ML training container 1030 in some embodiments. For example, the code 1037 includes some or all of the executable instructions that form the container image of the ML training container 1030 initialized therein. Thus, the virtual machine instance 1022 executes some or all of the executable instructions that form the container image of the ML training container 1030 initialized therein to train a machine learning model. The virtual machine instance 1022 executes some or all of the executable instructions according to the hyperparameter values included in the training request. As an illustrative example, the virtual machine instance 1022 trains a machine learning model by identifying values for certain parameters (e.g., coefficients, weights, centroids, etc.). The identified values depend on hyperparameters that define how the training is performed. Thus, the virtual machine instance 1022 can execute the executable instructions to initiate a machine learning model training process, where the training process is run using the hyperparameter values included in the training request. Execution of the executable instructions can include the virtual machine instance 1022 applying the training data retrieved by the model training system 120 as input parameters to some or all of the instructions being executed.

In some embodiments, executing the executable instructions causes the virtual machine instance 1022 (e.g., the ML training container 1030) to generate model data. For example, the ML training container 1030 generates model data and stores the model data in a file system of the ML training container 1030. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 1030 such that the model data is written to the top container layer of the ML training container 1030 and/or the container image(s) that forms a portion of the ML training container 1030 is modified to include the model data.

The virtual machine instance 1022 (or the model training system 120 itself) pulls the generated model data from the ML training container 1030 and stores the generated model data in the training model data store 1075 in an entry associated with the virtual machine instance 1022 and/or the machine learning model being trained. In some embodiments, the virtual machine instance 1022 generates a single file that includes model data and stores the single file in the training model data store 1075. In some embodiments, the virtual machine instance 1022 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 1022 can package the multiple files into a single file once training is complete and store the single file in the training model data store 1075. Alternatively, the virtual machine instance 1022 stores the multiple files in the training model data store 1075. The virtual machine instance 1022 stores the file(s) in the training model data store 1075 while the training process is ongoing and/or after the training process is complete.

In some embodiments, the virtual machine instance 1022 regularly stores model data file(s) in the training model data store 1075 as the training process is ongoing. Thus, model data file(s) can be stored in the training model data store 1075 at different times during the training process. Each set of model data files corresponding to a particular time or each set of model data files present in the training model data store 1075 as of a particular time could be checkpoints that represent different versions of a partially-trained machine learning model during different stages of the training process. Accordingly, before training is complete, a user, via the user device 1002 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 1075.

In some embodiments, a virtual machine instance 1022 executes code 1037 stored in a plurality of ML training containers 1030. For example, the algorithm included in the container image can be in a format that allows for the parallelization of the training process. Thus, the model training system 120 can create multiple copies of the container image provided in a training request and cause the virtual machine instance 1022 to load each container image copy in a separate ML training container 1030. The virtual machine instance 1022 can then execute, in parallel, the code 1037 stored in the ML training containers 1030. The virtual machine instance 1022 can further provide configuration information to each ML training container 1030 (e.g., information indicating that 'N' ML training containers 1030 are collectively training a machine learning model and that a particular ML training container 1030 receiving the configuration information is ML training container 1030 number X of N), which can be included in the resulting model data. By parallelizing the training process, the model training system 120 can significantly reduce the training time in some embodiments.

In some embodiments, a plurality of virtual machine instances 1022 execute code 1037 stored in a plurality of ML training containers 1030. For example, the resources used to train a particular machine learning model can exceed the limitations of a single virtual machine instance 1022. However, the algorithm included in the container image can be in a format that allows for the parallelization of the training process. Thus, the model training system 120 can create multiple copies of the container image provided in a training request, initialize multiple virtual machine instances 1022, and cause each virtual machine instance 1022 to load a container image copy in one or more separate ML training containers 1030. The virtual machine instances 1022 can then each execute the code 1037 stored in the ML training containers 1030 in parallel. The model training system 120 can further provide configuration information to each ML training container 1030 via the virtual machine instances 1022 (e.g., information indicating that N ML training containers 1030 are collectively training a machine learning model and that a particular ML training container 1030 receiving the configuration information is ML training container 1030 number X of N, information indicating that M virtual machine instances 1022 are collectively training a machine learning model and that a particular ML training container 1030 receiving the configuration information is initialized in virtual machine instance 1022 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 1022 that execute the code 1037. Thus, the parallelization can occur over different physical computing devices in addition to over different virtual machine instances 1022 and/or ML training containers 1030.

In some embodiments, the model training system 120 includes a ML model evaluator 1028. The ML model evaluator 1028 can monitor virtual machine instances 1022 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 1028 can obtain the model data for a machine learning model being trained and evaluation data from the training data store 1060. The evaluation data is separate from the data used to train a machine learning model and includes both input data and expected outputs (e.g., known results), and thus the ML model evaluator 1028 can define a machine learning model using the model data and execute the machine learning model by providing the input data as inputs to the machine learning model. The ML model evaluator 1028 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 1028 periodically generates model metrics during the training process and stores the model metrics in the training metrics data store 1065 in some embodiments. While the machine learning model is being trained, a user, via the user device 1002, can access and retrieve the model metrics from the training metrics data store 1065. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 1002, can transmit a request to the model training system 120 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 1022 to optionally delete an existing ML training container 1030, create and initialize a new ML training container 1030 using some or all of the information included in the request, and execute the code 1037 stored in the new ML training container 1030 to restart the machine learning model training process. As another example, the model training system 120 can cause the virtual machine instance 1022 to modify the execution of code stored in an existing ML training container 1030 according to the data provided in the modification request. In some embodiments, the user, via the user device 1002, can transmit a request to the model training system 120 to stop the machine learning model training process. The model training system 120 can then instruct the virtual machine instance 1022 to delete the ML training container 1030 and/or to delete any model data stored in the training model data store 1075.

As described below, in some embodiments, the model data stored in the training model data store 1075 is used by the model hosting system 140 to deploy machine learning models. Alternatively, or additionally, a user device 1002 or another computing device (not shown) can retrieve the model data from the training model data store 1075 to implement a learning algorithm in an external device. As an illustrative example, a robotic device can include sensors to capture input data. A user device 1002 can retrieve the model data from the training model data store 1075 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 1022 are shown in FIG. 10 as a single grouping of virtual machine instances 1022, some embodiments of the present application separate virtual machine instances 1022 that are actively assigned to execute tasks from those virtual machine instances 1022 that are not actively assigned to execute tasks. For example, those virtual machine instances 1022 actively assigned to execute tasks are grouped into an "active pool," while those virtual machine instances 1022 not actively assigned to execute tasks are placed within a "warming pool." In some embodiments, those virtual machine instances 1022 within the warming pool can be pre-initialized with an operating system, language runtimes, and/or other software required to enable rapid execution of tasks (e.g., rapid initialization of machine learning model training in ML training container(s) 1030) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model hosting system 140, etc.). The processing unit can also communicate to and from a memory of a virtual machine instance 1022 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 1042. The model hosting system 140 can handle the acquisition and configuration of compute capacity (e.g., containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 1002 via frontend 1049 of the model hosting system 140, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 1042 are utilized to execute tasks. For example, such tasks can include executing a machine learning model. As shown in FIG. 10, each virtual machine instance 1042 includes an operating system (OS) 1044, a language runtime 1046, and one or more ML scoring containers 1050. The ML scoring containers 1050 are similar to the ML training containers 1030 in that the ML scoring containers 1050 are logical units created within a virtual machine instance using the resources available on that instance and can be utilized to isolate execution of a task from other processes (e.g., task executions) occurring in the instance. In some embodiments, the ML scoring containers 1050 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 1050 (e.g., creation of new files, modification of existing files, deletion of files, etc.) are stored in the top container layer. If a ML scoring container 1050 is deleted, the top container layer is also deleted. However, the container image(s) that form a portion of the deleted ML scoring container 1050 can remain unchanged. The ML scoring containers 1050 can be implemented, for example, as Linux containers.

The ML scoring containers 1050 each include a runtime 1054, code 1056, and dependencies 1052 (e.g., supporting software such as libraries) needed by the code 1056 in some embodiments. The runtime 1054 can be defined by one or more executable instructions that form at least a portion of a container image that is used to form the ML scoring container 1050 (e.g., the executable instruction(s) in the container image that define the operating system and/or runtime to run in the container formed from the container image). The code 1056 includes one or more executable instructions that form at least a portion of a container image that is used to form the ML scoring container 1050. For example, the code 1056 includes the executable instructions in the container image that represent an algorithm that defines a machine learning model, which may reference dependencies 1052. The code 1056 can also include model data that represent characteristics of the defined machine learning model, as described in greater detail below. The runtime 1054 is configured to execute the code 1056 in response to an instruction to begin execution of a machine learning model. Execution of the code 1056 results in the generation of outputs (e.g., predicted or "inferred" results), as described in greater detail below.

In some embodiments, the runtime 1054 is the same as the runtime 1046 utilized by the virtual machine instance 1042. In some embodiments, runtime 1054 is different than the runtime 1046 utilized by the virtual machine instance 1042.

In some embodiments, the model hosting system 140 uses one or more container images included in a deployment request (or a container image retrieved from the container data store 1070 in response to a received deployment request) to create and initialize a ML scoring container 1050 in a virtual machine instance 1042. For example, the model hosting system 140 creates a ML scoring container 1050 that includes the container image(s) and/or a top container layer.

As described above, a user device 1002 can submit a deployment request and/or an execution request to the model hosting system 140 via the frontend 1049 in some embodiments. A deployment request causes the model hosting system 140 to deploy a trained machine learning model into a virtual machine instance 1042. For example, the deployment request can include an identification of an endpoint (e.g., an endpoint name, such as an HTTP endpoint name) and an identification of one or more trained machine learning models (e.g., a location of one or more model data files stored in the training model data store 1075). Optionally, the deployment request also includes an identification of one or more container images stored in the container data store 1070.

Upon receiving the deployment request, the model hosting system 140 initializes ones or more ML scoring containers 1050 in one or more hosted virtual machine instance 1042. In embodiments in which the deployment request includes an identification of one or more container images, the model hosting system 140 forms the ML scoring container(s) 1050 from the identified container image(s). For example, a container image identified in a deployment request can be the same container image used to form an ML training container 1030 used to train the machine learning model corresponding to the deployment request. Thus, the code 1056 of the ML scoring container(s) 1050 includes one or more executable instructions in the container image(s) that represent an algorithm that defines a machine learning model. In embodiments in which the deployment request does not include an identification of a container image, the model hosting system 140 forms the ML scoring container(s) 1050 from one or more container images stored in the container data store 1070 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 1050 by retrieving model data corresponding to the identified trained machine learning model(s) in some embodiments. For example, the deployment request can identify a location of model data file(s) stored in the training model data store 1075. In embodiments in which a single model data file is identified in the deployment request, the model hosting system 140 retrieves the identified model data file from the training model data store 1075 and inserts the model data file into a single ML scoring container 1050, which forms a portion of code 1056. In some embodiments, the model data file is archived or compressed (e.g., formed from a package of individual files). Thus, the model hosting system 140 unarchives or decompresses the model data file to obtain multiple individual files and inserts the individual files into the ML scoring container 1050. In some embodiments, the model hosting system 140 stores the model data file in the same location as the location in which the model data file was stored in the ML training container 1030 that generated the model data file. For example, the model data file initially was stored in the top container layer of the ML training container 1030 at a certain offset, and the model hosting system 140 then stores the model data file in the top container layer of the ML scoring container 1050 at the same offset.

In embodiments in which multiple model data files are identified in the deployment request, the model hosting system 140 retrieves the identified model data files from the training model data store 1075. The model hosting system 140 can insert the model data files into the same ML scoring container 1050, into different ML scoring containers 1050 initialized in the same virtual machine instance 1042, or into different ML scoring containers 1050 initialized in different virtual machine instances 1042. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 1050 with the endpoint identified in the deployment request. For example, each of the initialized ML scoring container(s) 1050 can be associated with a network address. The model hosting system 140 can map the network address(es) to the identified endpoint, and the model hosting system 140 or another system (e.g., a routing system, not shown) can store the mapping. Thus, a user device 1002 can refer to trained machine learning model(s) stored in the ML scoring container(s) 1050 using the endpoint. This allows for the network address of an ML scoring container 1050 to change without causing the user operating the user device 1002 to change the way in which the user refers to a trained machine learning model.

Once the ML scoring container(s) 1050 are initialized, the ML scoring container(s) 1050 are ready to execute trained machine learning model(s). In some embodiments, the user device 1002 transmits an execution request to the model hosting system 140 via the frontend 1049, where the execution request identifies an endpoint and includes an input to a machine learning model (e.g., a set of input data). The model hosting system 140 or another system (e.g., a routing system, not shown) can obtain the execution request, identify the ML scoring container(s) 1050 corresponding to the identified endpoint, and route the input to the identified ML scoring container(s) 1050.

In some embodiments, a virtual machine instance 1042 executes the code 1056 stored in an identified ML scoring container 1050 in response to the model hosting system 140 receiving the execution request. In particular, execution of the code 1056 causes the executable instructions in the code 1056 corresponding to the algorithm to read the model data file stored in the ML scoring container 1050, use the input included in the execution request as an input parameter, and generate a corresponding output. As an illustrative example, the algorithm can include coefficients, weights, layers, cluster centroids, and/or the like. The executable instructions in the code 1056 corresponding to the algorithm can read the model data file to determine values for the coefficients, weights, layers, cluster centroids, and/or the like. The executable instructions can include input parameters, and the input included in the execution request can be supplied by the virtual machine instance 1042 as the input parameters. With the machine learning model characteristics and the input parameters provided, execution of the executable instructions by the virtual machine instance 1042 can be completed, resulting in an output.

In some embodiments, the virtual machine instance 1042 stores the output in the model prediction data store 1080. Alternatively or in addition, the virtual machine instance 1042 transmits the output to the user device 1002 that submitted the execution result via the frontend 1049.

In some embodiments, the execution request corresponds to a group of related trained machine learning models. Thus, the ML scoring container 1050 can transmit the output to a second ML scoring container 1050 initialized in the same virtual machine instance 1042 or in a different virtual machine instance 1042. The virtual machine instance 1042 that initialized the second ML scoring container 1050 can then execute second code 1056 stored in the second ML scoring container 1050, providing the received output as an input parameter to the executable instructions in the second code 1056. The second ML scoring container 1050 further includes a model data file stored therein, which is read by the executable instructions in the second code 1056 to determine values for the characteristics defining the machine learning model. Execution of the second code 1056 results in a second output. The virtual machine instance 1042 that initialized the second ML scoring container 1050 can then transmit the second output to the model prediction data store 1080 and/or the user device 1002 via the frontend 1049 (e.g., if no more trained machine learning models are needed to generate an output) or transmit the second output to a third ML scoring container 1050 initialized in the same or different virtual machine instance 1042 (e.g., if outputs from one or more additional trained machine learning models are needed), and the above-referenced process can be repeated with respect to the third ML scoring container 1050.

While the virtual machine instances 1042 are shown in FIG. 10 as a single grouping of virtual machine instances 1042, some embodiments of the present application separate virtual machine instances 1042 that are actively assigned to execute tasks from those virtual machine instances 1042 that are not actively assigned to execute tasks. For example, those virtual machine instances 1042 actively assigned to execute tasks are grouped into an "active pool," while those virtual machine instances 1042 not actively assigned to execute tasks are placed within a "warming pool." In some embodiments, those virtual machine instances 1042 within the warming pool can be pre-initialized with an operating system, language runtimes, and/or other software required to enable rapid execution of tasks (e.g., rapid initialization of ML scoring container(s) 1050, rapid execution of code 1056 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 1002, the model training system 120, etc.). The processing unit can also communicate to and from a memory of a virtual machine instance 1042 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 120 and the model hosting system 140 depicted in FIG. 10 are not meant to be limiting. For example, the model training system 120 and/or the model hosting system 140 could also operate within a computing environment having a fewer or greater number of devices than are illustrated in FIG. 10. Thus, the depiction of the model training system 120 and/or the model hosting system 140 in FIG. 10 may be taken as illustrative and not limiting to the present disclosure. For example, the model training system 120 and/or the model hosting system 140 or various constituents thereof could implement various Web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 1029 processes all training requests received from user devices 1002 and provisions virtual machine instances 1022. In some embodiments, the frontend 1029 serves as a front door to all the other services provided by the model training system 120. The frontend 1029 processes the requests and makes sure that the requests are properly authorized. For example, the frontend 1029 may determine whether the user associated with the training request is authorized to initiate the training process.

Similarly, frontend 1049 processes all deployment and execution requests received from user devices 1002 and provisions virtual machine instances 1042. In some embodiments, the frontend 1049 serves as a front door to all the other services provided by the model hosting system 140. The frontend 1049 processes the requests and makes sure that the requests are properly authorized. For example, the frontend 1049 may determine whether the user associated with a deployment request or an execution request is authorized to access the indicated model data and/or to execute the indicated machine learning model.

The training data store 1060 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 1060 is depicted as being located external to the model training system 120 and the model hosting system 140, this is not meant to be limiting. For example, in some embodiments not shown, the training data store 1060 is located internal to at least one of the model training system 120 or the model hosting system 140.

In some embodiments, the training metrics data store 1065 stores model metrics. While the training metrics data store 1065 is depicted as being located external to the model training system 120 and the model hosting system 140, this is not meant to be limiting. For example, in some embodiments not shown, the training metrics data store 1065 is located internal to at least one of the model training system 120 or the model hosting system 140.

The container data store 1070 stores container images, such as container images used to form ML training containers 1030 and/or ML scoring containers 1050, that can be retrieved by various virtual machine instances 1022 and/or 1042. While the container data store 1070 is depicted as being located external to the model training system 120 and the model hosting system 140, this is not meant to be limiting. For example, in some embodiments not shown, the container data store 1070 is located internal to at least one of the model training system 120 and the model hosting system 140.

The training model data store 1075 stores model data files. In some embodiments, some of the model data files are comprised of a single file, while other model data files are packages of multiple individual files. While the training model data store 1075 is depicted as being located external to the model training system 120 and the model hosting system 140, this is not meant to be limiting. For example, in some embodiments not shown, the training model data store 1075 is located internal to at least one of the model training system 120 or the model hosting system 140.

The model prediction data store 1080 stores outputs (e.g., execution results) generated by the ML scoring containers 1050 in some embodiments. While the model prediction data store 1080 is depicted as being located external to the model training system 120 and the model hosting system 140, this is not meant to be limiting. For example, in some embodiments not shown, the model prediction data store 1080 is located internal to at least one of the model training system 120 and the model hosting system 140.

While the model training system 120, the model hosting system 140, the training data store 1060, the training metrics data store 1065, the container data store 1070, the training model data store 1075, and the model prediction data store 1080 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 1002 via the one or more network(s) 106.

Various example user devices 1002 are shown in FIG. 10, including a desktop computer, laptop, and a mobile phone, each provided by way of illustration. In general, the user devices 1002 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 120 and/or the model hosting system 140 provides the user devices 1002 with one or more user interfaces, command-line interfaces (CLI), application programing interfaces (API), and/or other programmatic interfaces for submitting training requests, deployment requests, and/or execution requests. In some embodiments, the user devices 1002 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (e.g., for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 11:
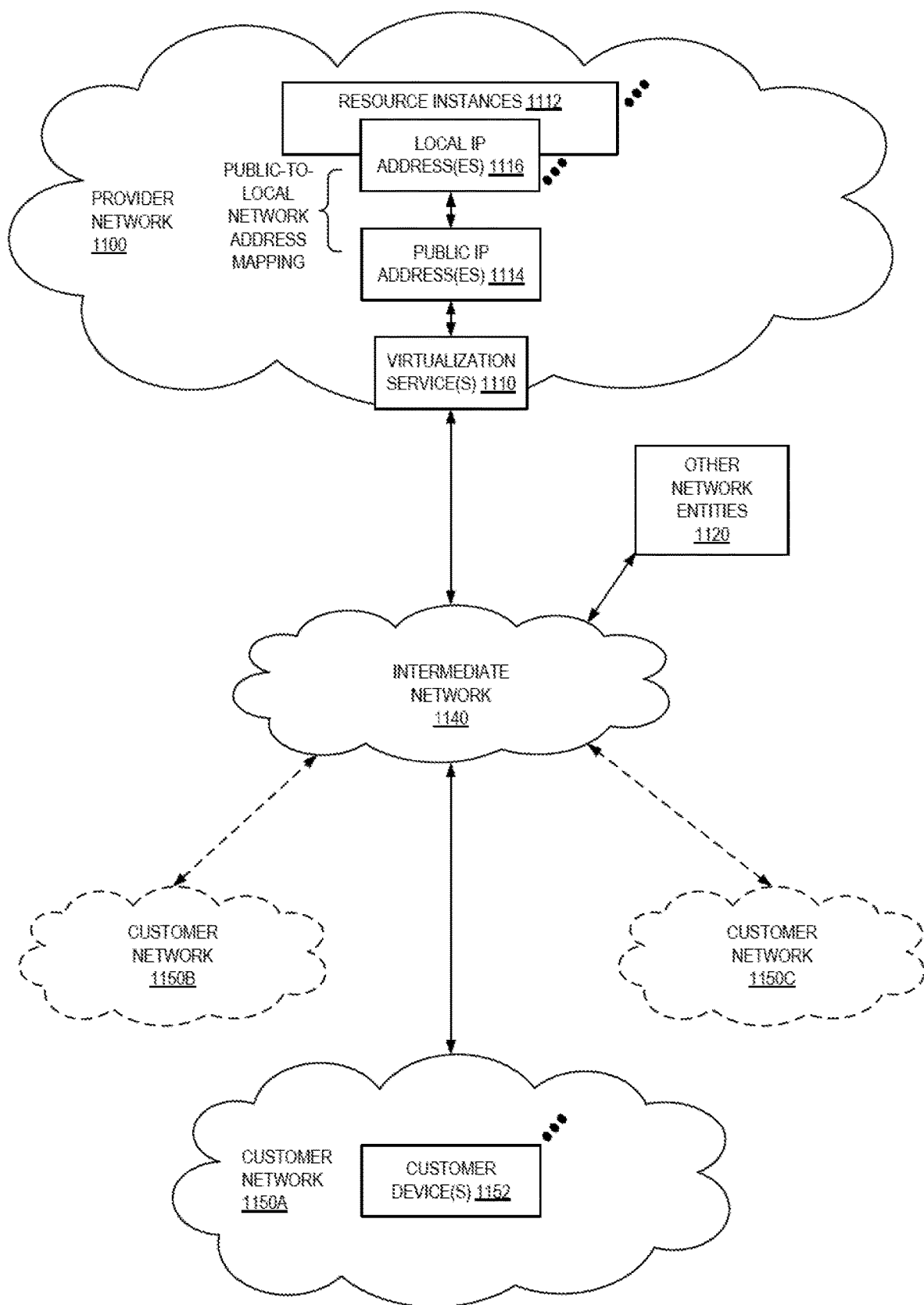
FIG. 11 illustrates an example provider network environment according to some embodiments.

FIG. 11 illustrates an example provider network (or "service provider system") environment according to some embodiments. A provider network 1100 may provide resource virtualization to customers via one or more virtualization services 1110 that allow customers to purchase, rent, or otherwise obtain instances 1112 of virtualized resources, including but not limited to computation and storage resources, implemented on devices within the provider network or networks in one or more data centers. Local Internet Protocol (IP) addresses 1116 may be associated with the resource instances 1112; the local IP addresses are the internal network addresses of the resource instances 1112 on the provider network 1100. In some embodiments, the provider network 1100 may also provide public IP addresses 1114 and/or public IP address ranges (e.g., Internet Protocol version 4 (IPv4) or Internet Protocol version 6 (IPv6) addresses) that customers may obtain from the provider 1100.

Conventionally, the provider network 1100, via the virtualization services 1110, may allow a customer of the service provider (e.g., a customer that operates one or more client networks 1150A-1150C including one or more customer device(s) 1152) to dynamically associate at least some public IP addresses 1114 assigned or allocated to the customer with particular resource instances 1112 assigned to the customer. The provider network 1100 may also allow the customer to remap a public IP address 1114, previously mapped to one virtualized computing resource instance 1112 allocated to the customer, to another virtualized computing resource instance 1112 that is also allocated to the customer. Using the virtualized computing resource instances 1112 and public IP addresses 1114 provided by the service provider, a customer of the service provider such as the operator of customer network(s) 1150A-1150C may, for example, implement customer-specific applications and present the customer's applications on an intermediate network 1140, such as the Internet. Other network entities 1120 on the intermediate network 1140 may then generate traffic to a destination public IP address 1114 published by the customer network(s) 1150A-1150C; the traffic is routed to the service provider data center, and at the data center is routed, via a network substrate, to the local IP address 1116 of the virtualized computing resource instance 1112 currently mapped to the destination public IP address 1114. Similarly, response traffic from the virtualized computing resource instance 1112 may be routed via the network substrate back onto the intermediate network 1140 to the source entity 1120.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1100; a customer may then assign their allocated public IP addresses to particular resource instances allocated to the customer. These public IP addresses may be referred to as customer public IP addresses, or simply customer IP addresses. Instead of being assigned by the provider network 1100 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 12:
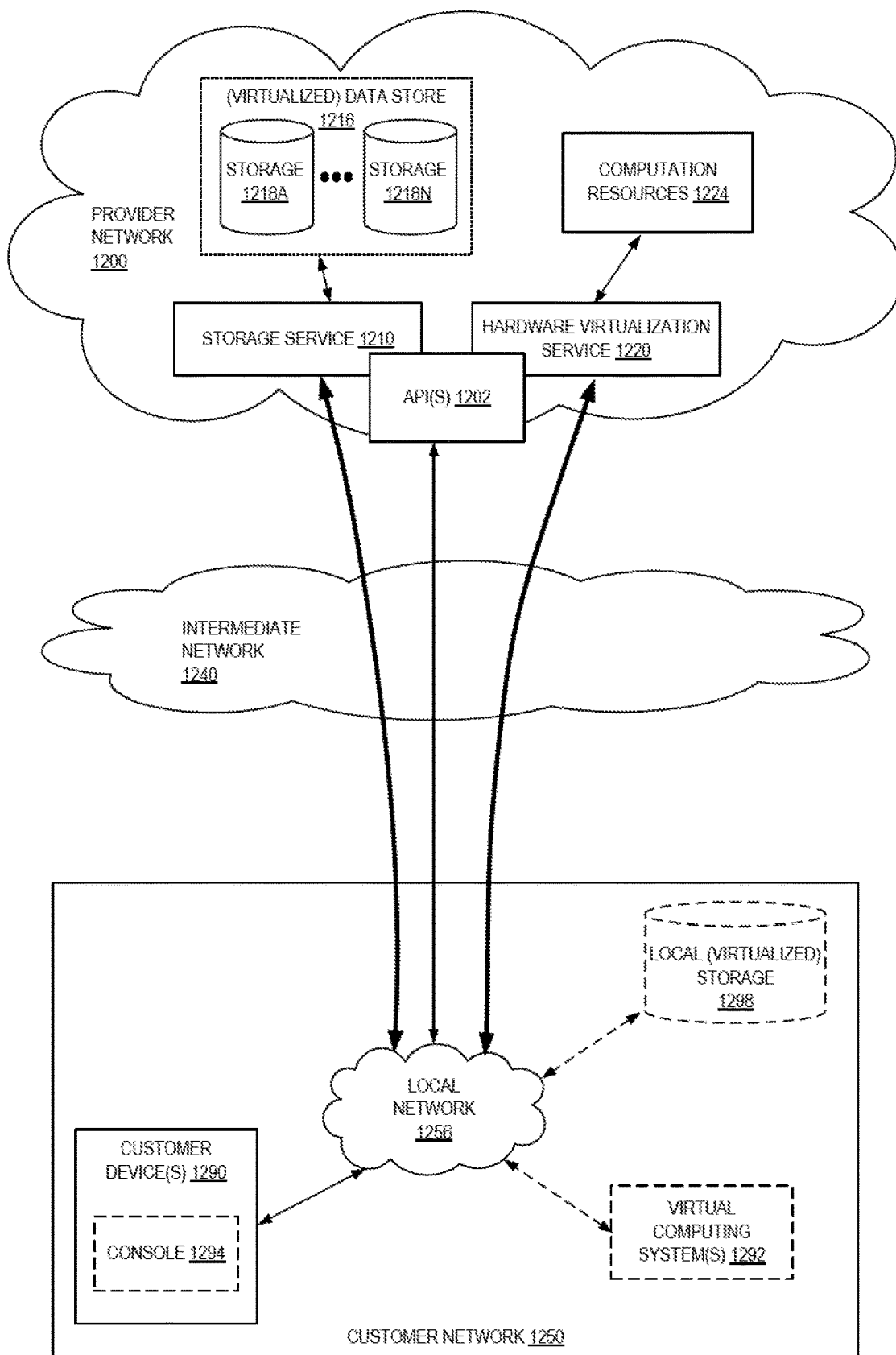
FIG. 12 is a block diagram of an example provider network that provides a storage service and a hardware virtualization service to customers according to some embodiments.

FIG. 12 is a block diagram of an example provider network that provides a storage service and a hardware virtualization service to customers, according to some embodiments. Hardware virtualization service 1220 provides multiple computation resources 1224 (e.g., VMs) to customers. The computation resources 1224 may, for example, be rented or leased to customers of the provider network 1200 (e.g., to a customer that implements customer network 1250). Each computation resource 1224 may be provided with one or more local IP addresses. Provider network 1200 may be configured to route packets from the local IP addresses of the computation resources 1224 to public Internet destinations, and from public Internet sources to the local IP addresses of computation resources 1224.

Provider network 1200 may provide a customer network 1250, for example coupled to intermediate network 1240 via local network 1256, the ability to implement virtual computing systems 1292 via hardware virtualization service 1220 coupled to intermediate network 1240 and to provider network 1200. In some embodiments, hardware virtualization service 1220 may provide one or more APIs 1202, for example a web services interface, via which a customer network 1250 may access functionality provided by the hardware virtualization service 1220, for example via a console 1294 (e.g., a web-based application, standalone application, mobile application, etc.). In some embodiments, at the provider network 1200, each virtual computing system 1292 at customer network 1250 may correspond to a computation resource 1224 that is leased, rented, or otherwise provided to customer network 1250.

From an instance of a virtual computing system 1292 and/or another customer device 1290 (e.g., via console 1294), the customer may access the functionality of storage service 1210, for example via one or more APIs 1202, to access data from and store data to storage resources 1218A-1218N of a virtual data store 1216 (e.g., a folder or "bucket", a virtualized volume, a database, etc.) provided by the provider network 1200. In some embodiments, a virtualized data store gateway (not shown) may be provided at the customer network 1250 that may locally cache at least some data, for example frequently-accessed or critical data, and that may communicate with storage service 1210 via one or more communications channels to upload new or modified data from a local cache so that the primary store of data (virtualized data store 1216) is maintained. In some embodiments, a user, via a virtual computing system 1292 and/or on another customer device 1290, may mount and access virtual data store 1216 volumes via storage service 1210 acting as a storage virtualization service, and these volumes may appear to the user as local (virtualized) storage 1298.

While not shown in FIG. 12, the virtualization service(s) may also be accessed from resource instances within the provider network 1200 via API(s) 1202. For example, a customer, appliance service provider, or other entity may access a virtualization service from within a respective virtual network on the provider network 1200 via an API 1202 to request allocation of one or more resource instances within the virtual network or within another virtual network.

Illustrative Systems

Figure 13:
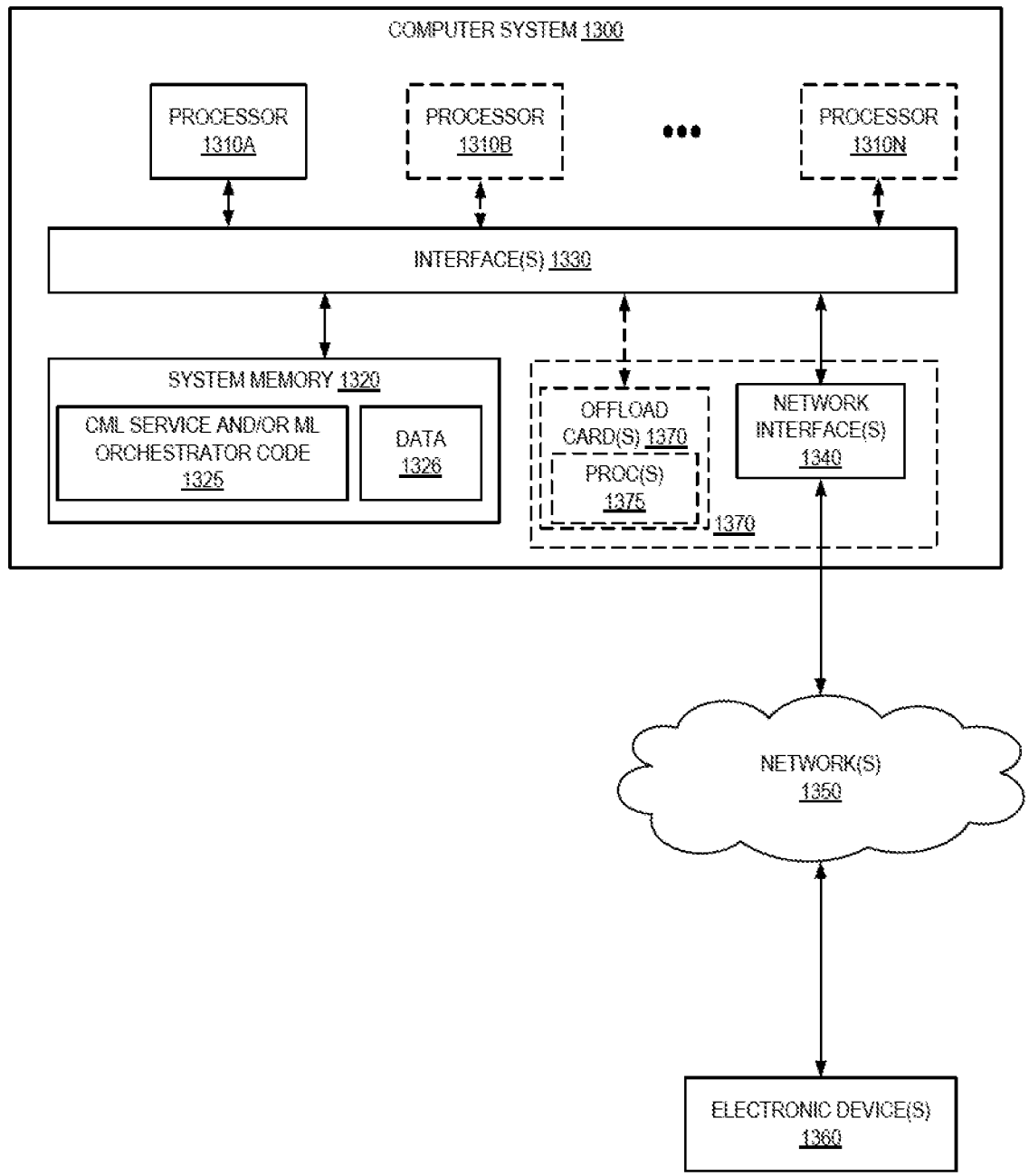
FIG. 13 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1300 illustrated in FIG. 13. In the illustrated embodiment, computer system 1300 includes one or more processors 1310 coupled to a system memory 1320 via an input/output (I/O) interface 1330. Computer system 1300 further includes a network interface 1340 coupled to I/O interface 1330. While FIG. 13 shows computer system 1300 as a single computing device, in various embodiments a computer system 1300 may include one computing device or any number of computing devices configured to work together as a single computer system 1300.

In various embodiments, computer system 1300 may be a uniprocessor system including one processor 1310, or a multiprocessor system including several processors 1310 (e.g., two, four, eight, or another suitable number). Processors 1310 may be any suitable processors capable of executing instructions. For example, in various embodiments, processors 1310 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1310 may commonly, but not necessarily, implement the same ISA.

System memory 1320 may store instructions and data accessible by processor(s) 1310. In various embodiments, system memory 1320 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1320 as CIVIL service and/or ML orchestrator code 1325 and data 1326.

In one embodiment, I/O interface 1330 may be configured to coordinate I/O traffic between processor 1310, system memory 1320, and any peripheral devices in the device, including network interface 1340 or other peripheral interfaces. In some embodiments, I/O interface 1330 may perform any necessary protocol, timing or other data transformations to convert data signals from one component (e.g., system memory 1320) into a format suitable for use by another component (e.g., processor 1310). In some embodiments, I/O interface 1330 may include support for devices attached through various types of peripheral buses, such as a variant of the Peripheral Component Interconnect (PCI) bus standard or the Universal Serial Bus (USB) standard, for example. In some embodiments, the function of I/O interface 1330 may be split into two or more separate components, such as a north bridge and a south bridge, for example. Also, in some embodiments some or all of the functionality of I/O interface 1330, such as an interface to system memory 1320, may be incorporated directly into processor 1310.

Network interface 1340 may be configured to allow data to be exchanged between computer system 1300 and other devices 1360 attached to a network or networks 1350, such as other computer systems or devices as illustrated in FIG. 1, for example. In various embodiments, network interface 1340 may support communication via any suitable wired or wireless general data networks, such as types of Ethernet network, for example. Additionally, network interface 1340 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1300 includes one or more offload cards 1370 (including one or more processors 1375, and possibly including the one or more network interfaces 1340) that are connected using an I/O interface 1330 (e.g., a bus implementing a version of the Peripheral Component Interconnect—Express (PCI-E) standard, or another interconnect such as a QuickPath interconnect (QPI) or UltraPath interconnect (UPI)). For example, in some embodiments the computer system 1300 may act as a host electronic device (e.g., operating as part of a hardware virtualization service) that hosts compute instances, and the one or more offload cards 1370 execute a virtualization manager that can manage compute instances that execute on the host electronic device. As an example, in some embodiments the offload card(s) 1370 can perform compute instance management operations such as pausing and/or un-pausing compute instances, launching and/or terminating compute instances, performing memory transfer/copying operations, etc. These management operations may, in some embodiments, be performed by the offload card(s) 1370 in coordination with a hypervisor (e.g., upon a request from a hypervisor) that is executed by the other processors 1310A-1310N of the computer system 1300. However, in some embodiments the virtualization manager implemented by the offload card(s) 1370 can accommodate requests from other entities (e.g., from compute instances themselves), and may not coordinate with (or service) any separate hypervisor.

In some embodiments, system memory 1320 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1300 via I/O interface 1330. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1300 as system memory 1320 or another type of memory. Further, a computer-accessible medium may include transmission media or signals such as electrical, electromagnetic, or digital signals, conveyed via a communication medium such as a network and/or a wireless link, such as may be implemented via network interface 1340.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle(R), Microsoft(R), Sybase(R), IBM(R), etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1218A-1218N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
deploying, within a multi-tenant service provider network, an object storage location for an account associated with a user;
deploying, within the multi-tenant service provider network, a machine learning (ML) orchestrator associated with the account;
detecting, by the ML orchestrator, that a training dataset comprising a plurality of columns of training data has been stored at the object storage location;
determining a target variable to infer corresponding to a particular column of the plurality of columns based on an identifier of the particular column in the training dataset or based on a user selection of the particular column, wherein each column of the plurality of columns comprises a respective set of values;
identifying a plurality of ML pipelines to evaluate; wherein each ML pipeline of the plurality of ML pipelines comprises a respective set of one or more preprocessing operations to apply to the training dataset;
evaluating the plurality of ML pipelines including: (a) for each ML pipeline of the plurality of ML pipeline, applying the respective set of one or more preprocessing operations to the training dataset, and (b) training, using a ML training service of the multi-tenant service provider network, a plurality of ML models corresponding to the plurality of ML pipelines to infer the target variable, wherein the plurality of ML models are generated according to a plurality of ML algorithms of the plurality of ML pipelines;

deploying at least one of the plurality of ML models via a ML hosting service of the multi-tenant service provider network;

utilizing the at least one of the plurality of ML models to generate one or more inferences; and storing the one or more inferences at the object storage location.

2. The computer-implemented method of claim 1, further comprising:

detecting that a testing dataset has been stored at the object storage location; and detecting that a configuration file has been stored at the object storage location, wherein training the plurality of ML models is further based at least in part on the testing dataset and values of the configuration file.

3. The computer-implemented method of claim 1, further comprising:

detecting that an inference dataset has been stored at the object storage location, wherein the inference dataset includes one or more samples, and wherein the utilizing the at least one of the plurality of ML models to generate the one or more inferences is based on providing the one or more samples as input to the at least one of the plurality of ML models; and transmitting the one or more inferences to a computing device outside of the multi-tenant service provider network.

4. A computer-implemented method comprising:

deploying, within a service provider network, a storage location for an account associated with a user;

deploying, within the service provider network, a machine learning (ML) orchestrator associated with the account;

detecting, by the ML orchestrator within a service provider network, that a training dataset comprising a plurality of columns of training data has been stored at the storage location;

determining, based on an identifier of a particular column in the training dataset or based on a user selection of the particular column, a target variable to infer corresponding to the particular column of the plurality of columns of training data, wherein each column of the plurality of columns comprises a respective set of values;

identifying a plurality of ML pipelines to evaluate;

wherein each ML pipeline of the plurality of ML pipelines comprises a respective set of one or more preprocessing operations to apply to the training dataset;

evaluating the plurality of ML pipelines including: (a) for each ML pipeline of the plurality of ML pipeline, applying the respective set of one or more preprocessing operations to the training dataset, and (b) training a plurality of ML models corresponding to the plurality of ML pipelines to infer the target variable, wherein the plurality of ML models are trained according to a plurality of ML algorithms of the plurality of ML pipelines; and providing at least one of the plurality of ML models to the user.

5. The computer-implemented method of claim 4, further comprising:

receiving, at the service provider network from a client device of the user, a request to enable code-free automated machine learning;

creating the storage location within a storage service of the service provider network; and deploying the ML orchestrator within the service provider network.

6. The computer-implemented method of claim 5, wherein:

the storage location is an object store for an account of the user; and the ML orchestrator is deployed as a function provided by an on-demand code execution service of the service provider network.

7. The computer-implemented method of claim 6, wherein:

detecting that the training dataset has been stored at the storage location comprises receiving, by the on-demand code execution service, an event message originated by the storage service or a monitoring service upon the training dataset being written to the storage location; and training the plurality of ML models comprises transmitting one or more commands to an ML service of the service provider network to perform an AutoML exploration job, the one or more commands including an identifier of the storage location or the training dataset.

8. The computer-implemented method of claim 4, further comprising:

detecting, by the ML orchestrator, that a testing dataset has been stored at the storage location, the testing dataset including one or more samples; and wherein training the plurality of ML models comprises utilizing the testing dataset.

9. The computer-implemented method of claim 4, further comprising:

detecting, by the ML orchestrator, that a configuration file has been stored at the storage location, the configuration file including one or more configuration values specified by the user; and wherein training the plurality of ML models is based on the one or more configuration values specified by the user.

10. The computer-implemented method of claim 4, further comprising:

in response to detecting, by the ML orchestrator, that an inference dataset file has been stored at the storage location, automatically utilizing at least one ML model of the plurality of ML models to generate one or more inferences, the utilizing comprising sending one or more samples from the inference dataset file to an endpoint associated with the at least one ML model; and transmitting the one or more inferences to a client device of the user or storing the one or more inferences at the storage location.

11. The computer-implemented method of claim 4, further comprising:

transmitting a message to an ML hosting service of the service provider network to host the plurality of ML models;

receiving, from the ML hosting service, an identifier of an endpoint associated with the plurality of ML models; and utilizing at least one of the plurality of ML models to generate one or more inferences, the utilizing comprising sending one or more inference requests to the endpoint.

12. The computer-implemented method of claim 4, further comprising:

detecting, by the ML orchestrator, a change to the training dataset resulting in a modified training dataset, wherein the change comprises at least one of an addition of one or more samples, a removal of one or more samples, or a modification of values of one or more samples; and
causing a retraining of at least the plurality of ML models based on the modified training dataset.

13. The computer-implemented method of claim 4, further comprising:
obtaining, by the ML orchestrator, an identifier of an AutoML system, wherein the identifier was specified by the user, and wherein the AutoML system comprises an AutoML library or an AutoML service provided within the service provider network; and
training the plurality of ML models comprises utilizing the AutoML system associated with the identifier.

14. The computer-implemented method of claim 4, further comprising:
providing, to a computing device of the user, data for one or more user interfaces, the one or more user interfaces identifying the plurality of machine learning (ML) models and a plurality of intermediate training results corresponding to the plurality of ML models,
wherein the one or more user interfaces allow the user to download the plurality of ML models; and
receiving a message originated by the computing device to download the at least one of the plurality of ML models;
wherein the providing the at least one of the plurality of ML models to the user comprises transmitting the at least one of the plurality of ML models to the computing device.

15. The computer-implemented method of claim 4, further comprising:
determining that the training dataset includes one or more unlabeled samples;
sending the one or more unlabeled samples to a data labeling service of the service provider network, wherein the data labeling service utilizes manual labeling or machine learning based labeling to generate one or more labels for the one or more unlabeled samples;
obtaining the one or more labels; and
wherein training the plurality of ML models comprises using the training dataset and the one or more labels.

16. The computer-implemented method of claim 4, wherein the plurality of ML models are trained at least partially in parallel in that at least two of the plurality of ML models are actively trained at a same point in time by at least two different compute instances.

17. The computer-implemented method of claim 4, further comprising:
receiving a request message originated by a computing device of the user to deploy a ML pipeline corresponding to the plurality of ML models;
causing a model hosting system of the service provider network to deploy the ML pipeline behind an endpoint; and
transmitting an identifier of the endpoint to the computing device or to the storage location.

18. A system comprising:
a storage service implemented by a first one or more electronic devices of a provider network, the storage service to deploy an object storage location for an account associated with a user, to receive a training dataset comprising a respective set of values for each column of a plurality of columns of training data transmitted on behalf of the user, to store the training dataset to the object storage location, and to send a notification to a machine learning (ML) orchestrator of the training dataset at the object storage location; and
the ML orchestrator implemented by a second one or more electronic devices of the provider network, the ML orchestrator including instructions that upon execution cause the ML orchestrator to:
detect, based on receipt of the notification, that the training dataset has been stored at the object storage location;
determine, based on an identifier of a particular column in the training dataset or based on a user selection of the particular column, a target variable to infer corresponding to the particular column of the plurality of columns of training data;
identify a plurality of ML pipelines to evaluate; wherein each ML pipeline of the plurality of ML pipelines comprises a respective set of one or more preprocessing operations to apply to the training dataset;
evaluate the plurality of ML pipelines including: (a) for each ML pipeline of the plurality of ML pipeline, apply the respective set of one or more preprocessing operations to the training dataset, and (b) train a plurality of ML models corresponding to the plurality of ML pipelines according to a plurality of ML algorithms of the plurality of ML pipelines to infer the target variable; and
provide at least one of the plurality of ML models to the user.

19. The system of claim 18, further comprising a ML training system implemented by a third one or more electronic devices of the provider network, the ML training system comprising instructions that, upon execution by the third one or more electronic devices, cause the ML training system to train the plurality of ML models in a plurality of ML model training jobs.

20. The system of claim 19, wherein the plurality of ML model training jobs include at least partially training a first ML model according to a first ML algorithm type and at least partially training a second ML model according to a second ML algorithm type, wherein the first ML algorithm type is different than the second ML algorithm type.

* * * * *